(12) United States Patent
Gupta et al.

(10) Patent No.: US 11,762,851 B2
(45) Date of Patent: Sep. 19, 2023

(54) METHODS AND SYSTEMS THAT PROVIDE A GENERAL QUERY INTERFACE TO MULTIPLE MANAGEMENT SERVICES AND APPLICATIONS

(71) Applicant: VMWARE, INC.

(72) Inventors: Kshitij Gupta, Bangalore (IN); Nicholas Stephen, Paris La Defense (FR)

(73) Assignee: VMware, Inc., Palo Alto, CA (US)

( * ) Notice: Subject to any disclaimer, the term of this patent is extended or adjusted under 35 U.S.C. 154(b) by 950 days.

(21) Appl. No.: 16/458,227

(22) Filed: Jul. 1, 2019

(65) Prior Publication Data

US 2020/0349157 A1    Nov. 5, 2020

(30) Foreign Application Priority Data

May 1, 2019  (IN) .............................. 201941017431

(51) Int. Cl.
*G06F 16/00* (2019.01)
*G06F 16/2452* (2019.01)
(Continued)

(52) U.S. Cl.
CPC .... *G06F 16/24522* (2019.01); *G06F 9/45558* (2013.01); *G06F 16/243* (2019.01);
(Continued)

(58) Field of Classification Search
CPC ............. G06F 16/9535; G06F 16/2471; G06F 16/24522; G06F 16/148; G06F 16/164; G06F 16/2358; G06F 16/2428; G06F 16/2452; G06F 16/24534; G06F 16/24535; G06F 16/2455; G06F 16/24568; G06F 16/24578; G06F 16/951; G06F 21/6227; G06F 16/245; G06F 16/24524; G06F 16/24575; G06F 16/248; G06F 16/283; G06F 16/84; G06F 21/6218; G06F 16/243; G06F 16/256; G06F 16/8358;
(Continued)

(56) References Cited

U.S. PATENT DOCUMENTS

2009/0144319 A1* 6/2009 Panwar ..................... G06F 9/54
2010/0174693 A1* 7/2010 Chandrasekhara ........................
G06F 16/9038
707/698

(Continued)

*Primary Examiner* — Yicun Wu

(57) ABSTRACT

The current document is directed to a universal-query adapter that provides, to users and clients, a universal-query-language interface to multiple different management applications and/or services within a cloud-computing facility or distributed cloud-computing facility. In one implementation, the universal-query adapter provides, for input of universal-query-language queries, a universal-query interface and, in turn, interfaces to service adapters, semantic providers, and translators associated with the multiple different management applications and/or services. The modular implementation of the universal-query adapter facilitates both implementation of the universal-query adapter as well as scalability of the universal-query adapter, allowing new and newly discovered management applications and/or services to be easily included in the set of target management applications and/or services for query execution.

19 Claims, 24 Drawing Sheets

(51) Int. Cl.
 *G06F 16/242* (2019.01)
 *G06F 9/455* (2018.01)
(52) U.S. Cl.
 CPC ............... *G06F 2009/4557* (2013.01); *G06F 2009/45583* (2013.01)
(58) Field of Classification Search
 CPC ........... G06F 16/838; G06F 2009/4557; G06F 2009/45583; G06F 9/45558
 See application file for complete search history.

(56) References Cited

U.S. PATENT DOCUMENTS

2014/0129583 A1* 5/2014 Munkes .............. G06F 16/9032
 707/760
2019/0370369 A1* 12/2019 Kulkarni ............. G06F 16/9535

* cited by examiner

| parsed items | resource name and attribute correlation service | semantic information |
|---|---|---|
| Resource Type: vm — 1412 | vm — 1418 | vm is type of node<br>node is entry in table Nodes<br>table Nodes(stringType, ...<br>node identifier : ID in table Nodes;<br>    ID in table VMs<br>table VMs (int ID, ... — 1420 |
| Variable Name: cpu.usage.average — 1421 | AVERAGE(cpu_usage) | cpu_usage is a field in<br>    table Node Metrics<br>table Node Metrics (DateTime DT, ...<br>float<br>range: [0.0, 1.0] |
| Value: 0.1 — 1426 | 0.1 | float<br>range: [0.0, 1.0]<br>valid — 1424 |
| Resource Type: host — 1422 | host_server | host-server is type of node<br>node is entry in table Nodes<br>table Nodes (string Type, ...<br>host_server identifier : ID in table<br>    Host_Servers |
| Variable Name: name — 1423 | hs_name | hs_name is field in table<br>    Host_Servers<br>table Host_Servers (int ID, ...<br>string<br>hs<*> |
| Value: US05-1-esx1 — 1427 | hs<US05-1-esx1> | string<br>hs<*><br>valid — 1425 |

FIG. 14C

```
SELECT v.name, v.ID, v.creation_dateTime
FROM VMs V INNER JOIN Host_Servers h ON v.hostID = h.ID
    INNER JOIN NodeMetrics n ON n.NodeID = v.ID
WHERE h.name = "US05-1-esx1" AND AVG(n.cup_usage) > 0.1;
```

METHODS AND SYSTEMS THAT PROVIDE A GENERAL QUERY INTERFACE TO MULTIPLE MANAGEMENT SERVICES AND APPLICATIONS

RELATED APPLICATIONS

Benefit is claimed under 35 U.S.C. 119(a)-(d) to Foreign Application Serial No. 201941017431 filed in India entitled "METHODS AND SYSTEMS THAT PROVIDE A GENERAL QUERY INTERFACE TO MULTIPLE MANAGEMENT SERVICES AND APPLICATIONS", on May 1, 2019, by VMWARE,Inc., which is herein incorporated in its entirety by reference for all purposes.

TECHNICAL FIELD

The current document is directed to distributed computing systems and, in particular, to methods and systems that provide a general query interface to multiple management services and applications.

BACKGROUND

Computer systems and computational technologies have steadily evolved, during the past 70 years, from initial vacuum-tube-based systems that lacked operating systems, compilers, network connectivity, and most other common features of modern computing systems to vast distributed computing systems that include large numbers of multi-processor servers, data-storage appliances, and multiple layers of internal communications networks interconnected by various types of wide-area networks and that provide computational resources to hundreds, thousands, tens of thousands, or more remote users. As operating systems, and virtualization layers have been developed and refined, over the years, in parallel with the advancements in computer hardware and networking, the robust execution environments provided by distributed operating systems and virtualization layers now provide a foundation for development and evolution of many different types of distributed application programs, including distributed database-management systems, distributed client-server applications, and distributed web-based service-provision applications. This has resulted in a geometric increase in the complexity of distributed computing systems, as a result of which owners, administrators, and users of distributed computing systems and consumers of computational resources provided by distributed computing systems increasingly rely on automated and semi-automated management and computational-resource-distribution subsystems to organize the activities of many users and computational-resource consumers and to control access to, and use of, computational resources within distributed computing systems.

One problem domain that has emerged in the area of distributed computing systems is that many different types of management services and management applications have been developed for managing cloud-computing facilities and distributed cloud-computing facilities. Each of these different management services and management applications may provide different functionalities and different views of the various computational resources within the cloud-computing facility that they monitor and manage. As a result, efforts have been made to standardize the user interfaces and application-programming interfaces ("APIs") provided by the various different management services and management applications. However, such efforts involve significant development efforts and fail to keep pace with the frequent emergence of new management services and management applications. Developers of cloud-computing management and administration services and application and managers and administrators of cloud-computing facilities continue to seek methods and systems for simplifying and aggregating the many different management services and management applications that may be used within a given cloud-computing facility or distributed cloud-computing facility.

SUMMARY

The current document is directed to a universal-query adapter that provides, to users and clients, a universal-query-language interface to multiple different management applications and/or services within a cloud-computing facility or distributed cloud-computing facility. In one implementation, the universal-query adapter provides, for input of universal-query-language queries, a universal-query interface and, in turn, interfaces to service adapters, semantic providers, and translators associated with the multiple different management applications and/or services. The modular implementation of the universal-query adapter facilitates both implementation of the universal-query adapter as well as scalability of the universal-query adapter, allowing new and newly discovered management applications and/or services to be easily included in the set of target management applications and/or services for universal query execution.

BRIEF DESCRIPTION OF THE DRAWINGS

FIGS. 14A-E provide examples of query validation and query translation in which the roles of the semantic providers and translators discussed above with reference to FIGS. 11-13 are illustrated.

DETAILED DESCRIPTION

Figure 1:
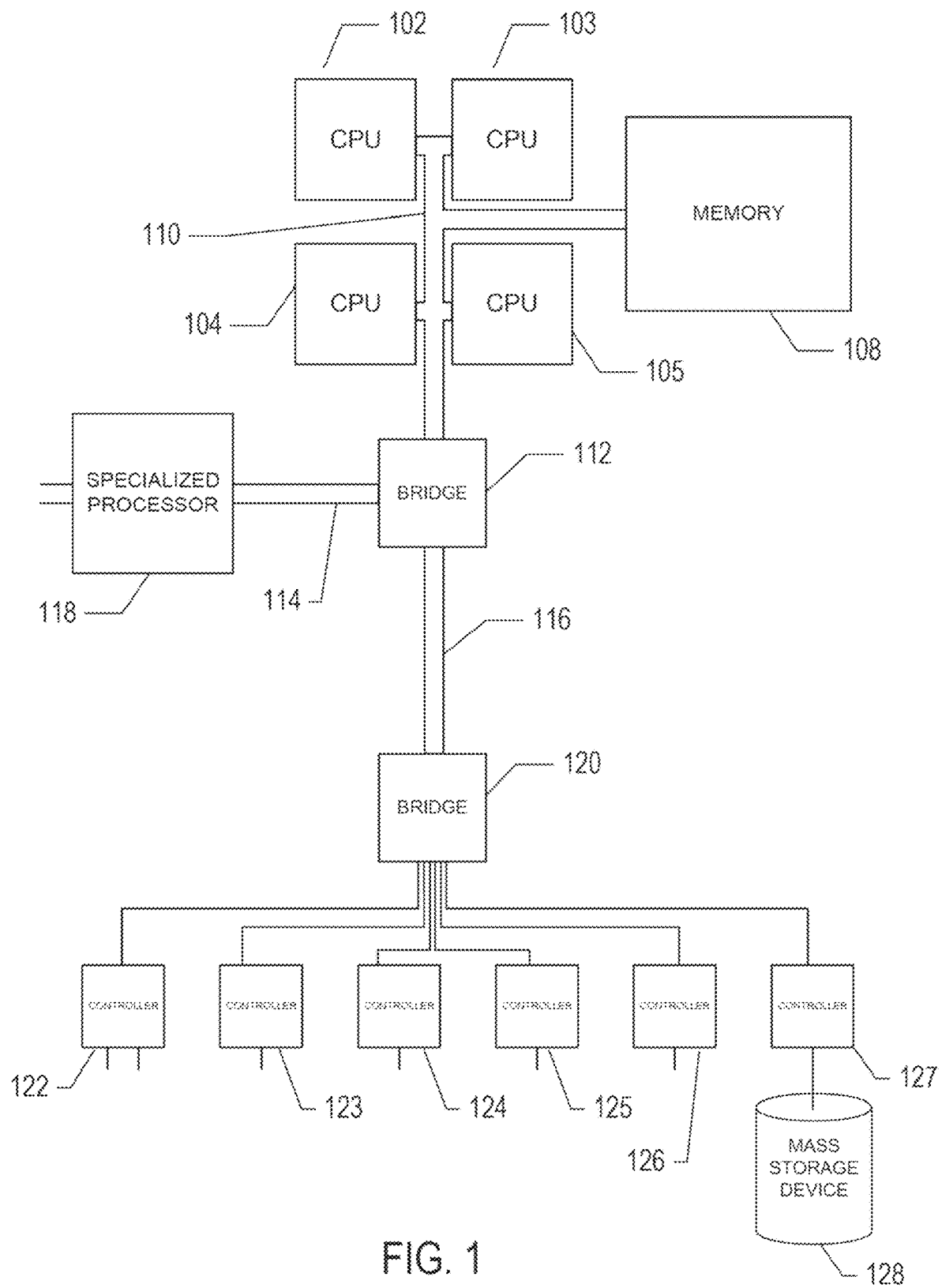
FIG. 1 provides a general architectural diagram for various types of computers.

The current document is directed to a universal-query adapter that provides, to users and clients, a universal-query-language interface to multiple different management applications and/or services within a cloud-computing facility or distributed cloud-computing facility. In a first subsection, below, a detailed description of computer hardware, complex computational systems, and virtualization is provided with reference to FIGS. 1-10. In a second subsection, the methods and systems to which the current document is directed are discussed with reference to FIGS. 11-19E.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
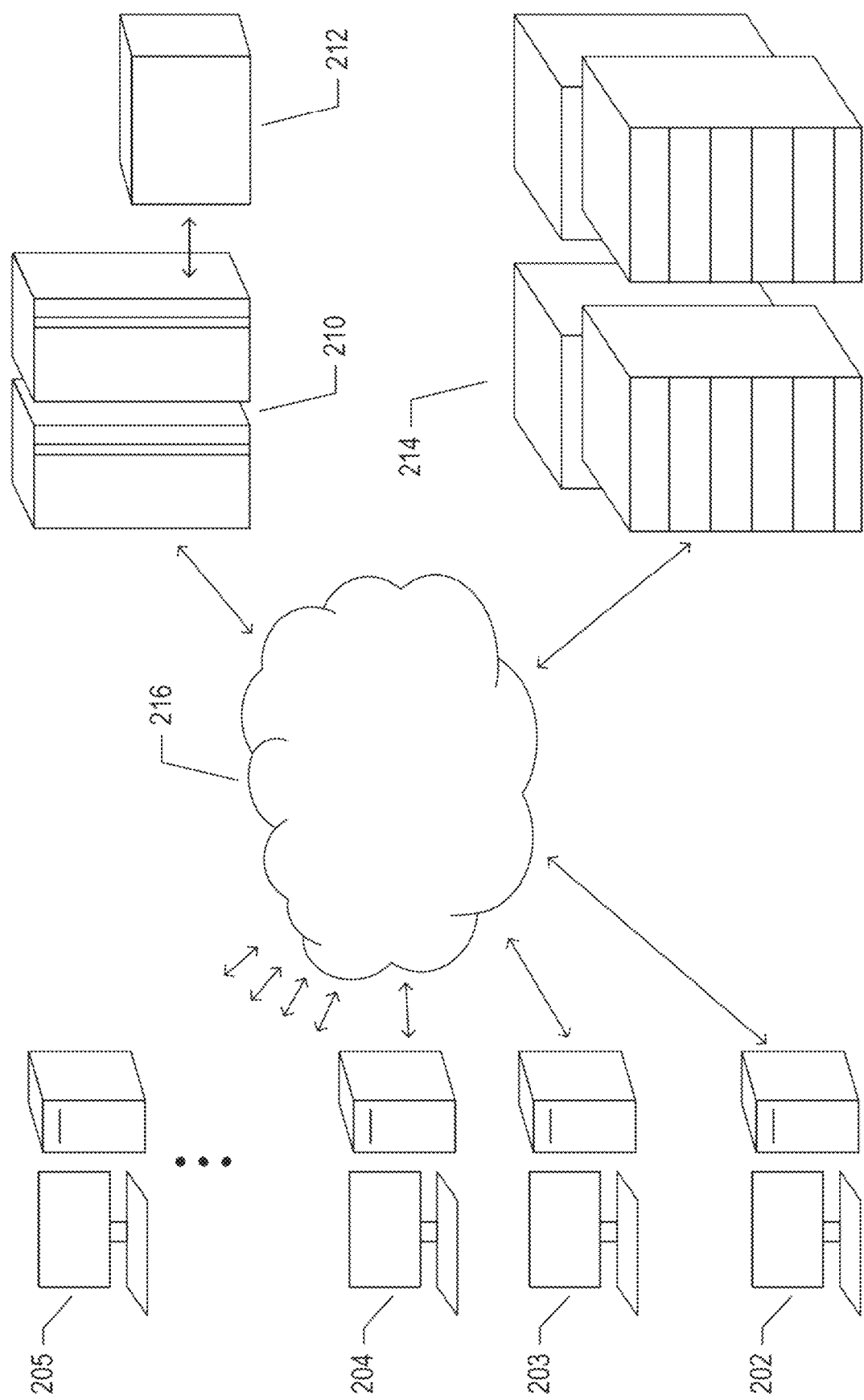
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities.

For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
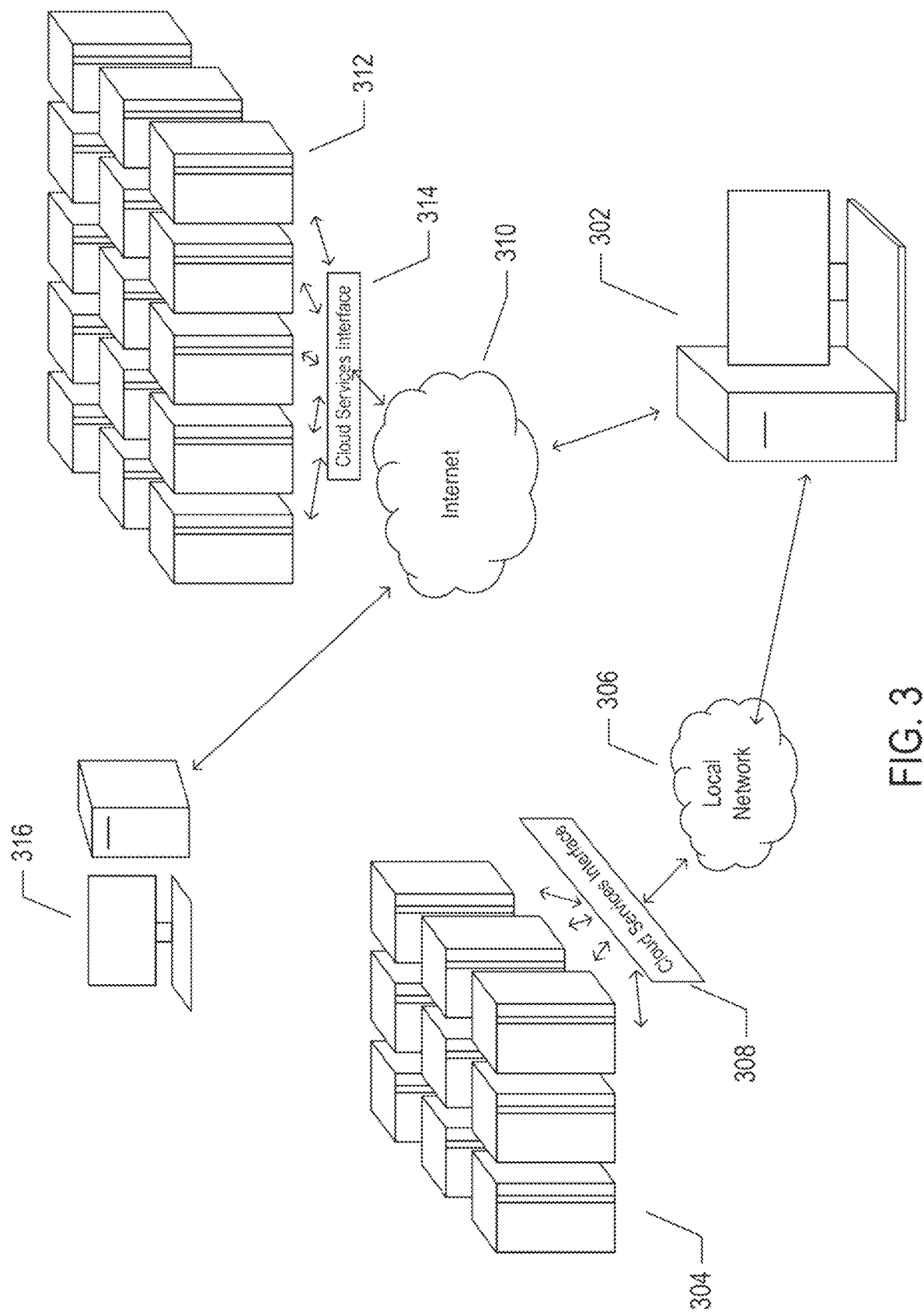
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
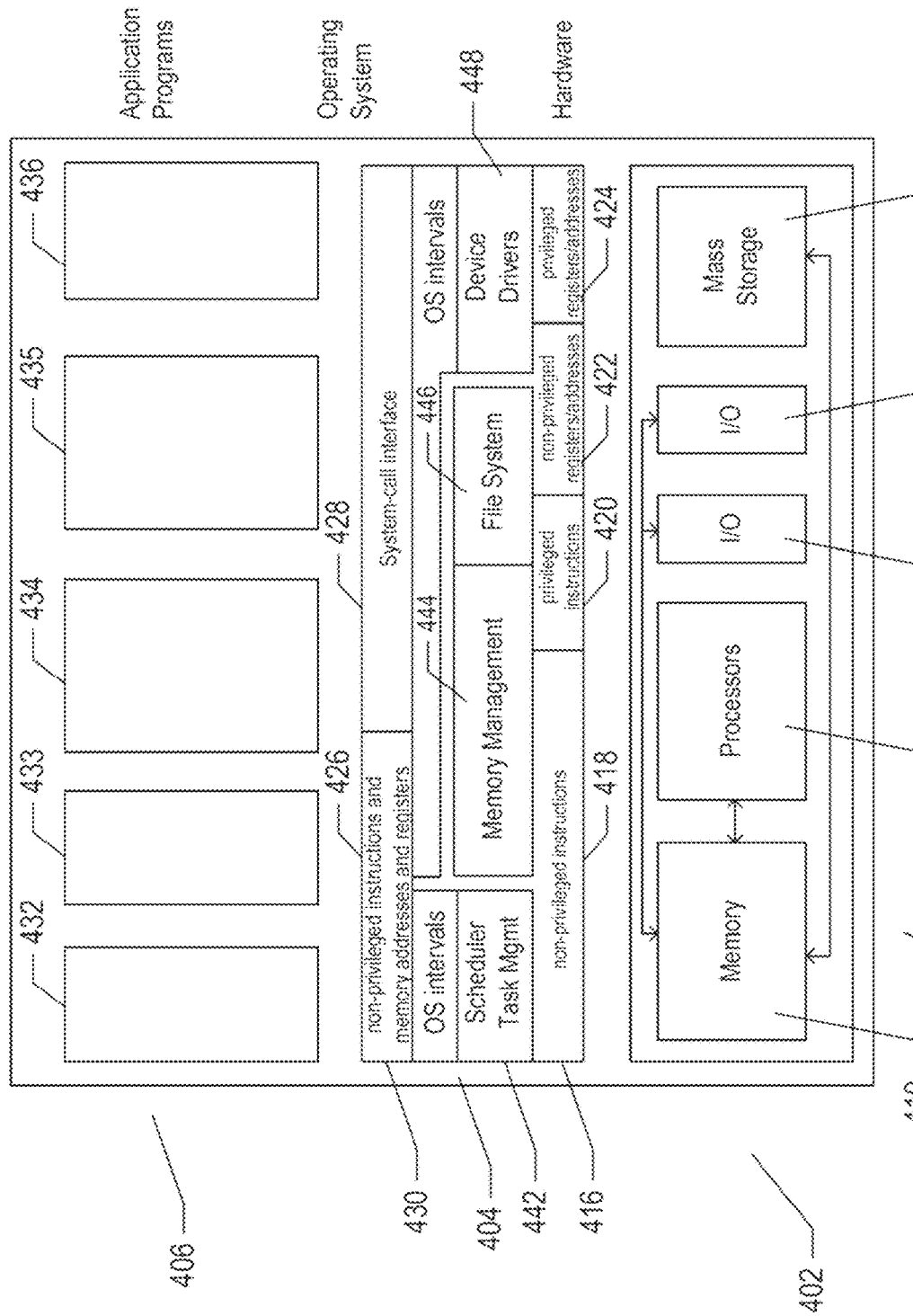
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
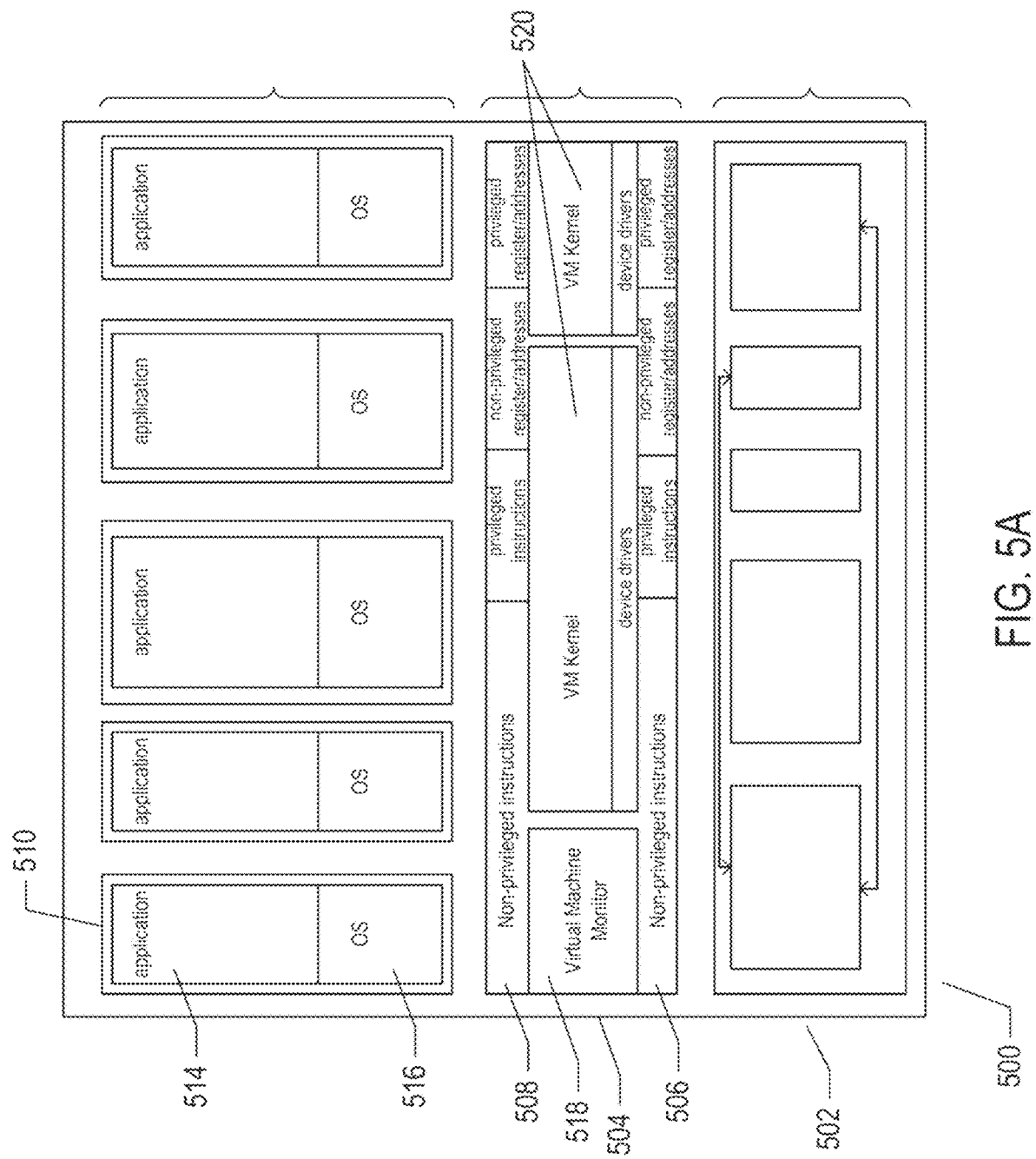
FIGS. 5A-D illustrate two types of virtual machine and virtual-machine execution environments.
Figure 5B:
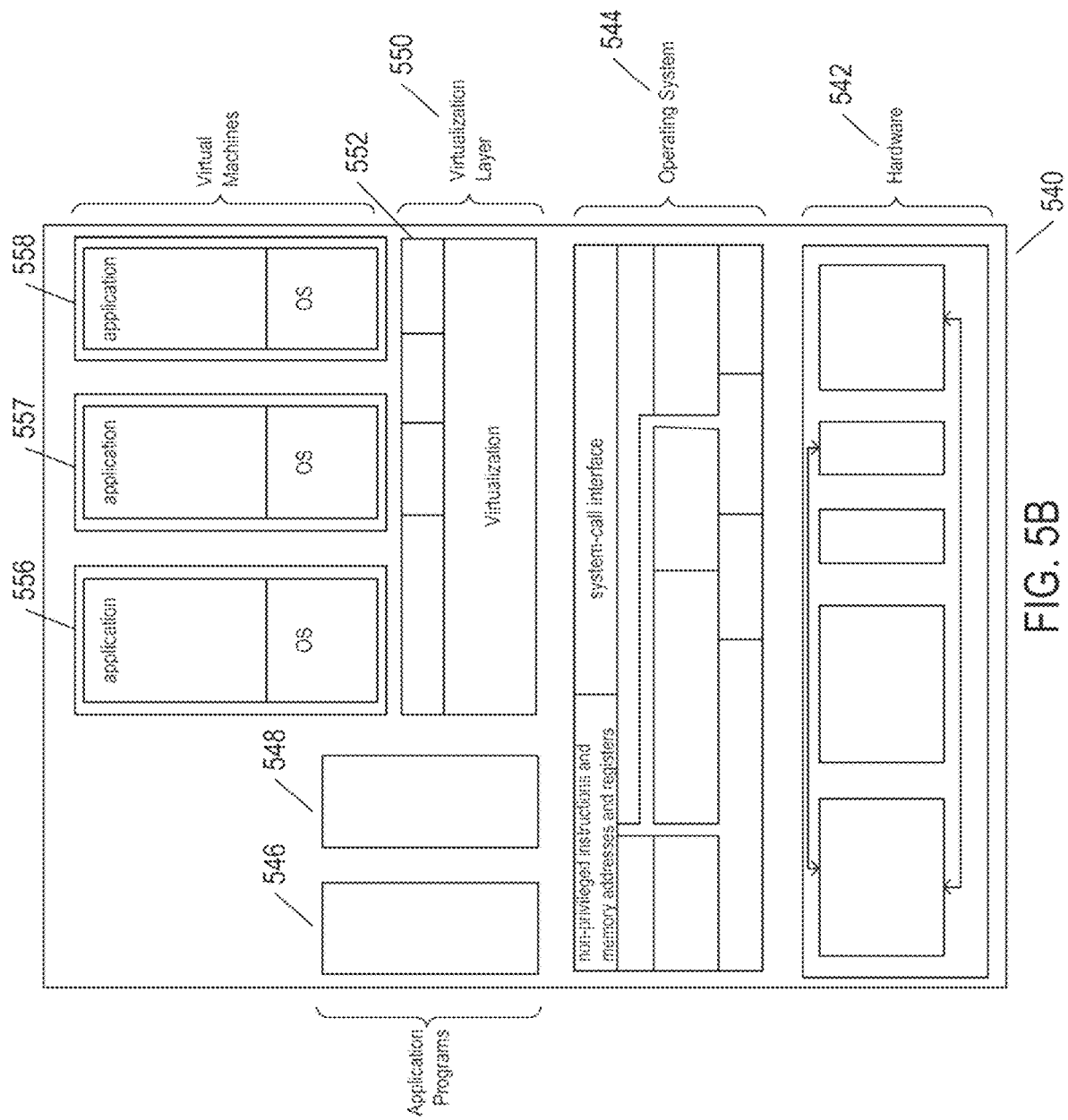

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
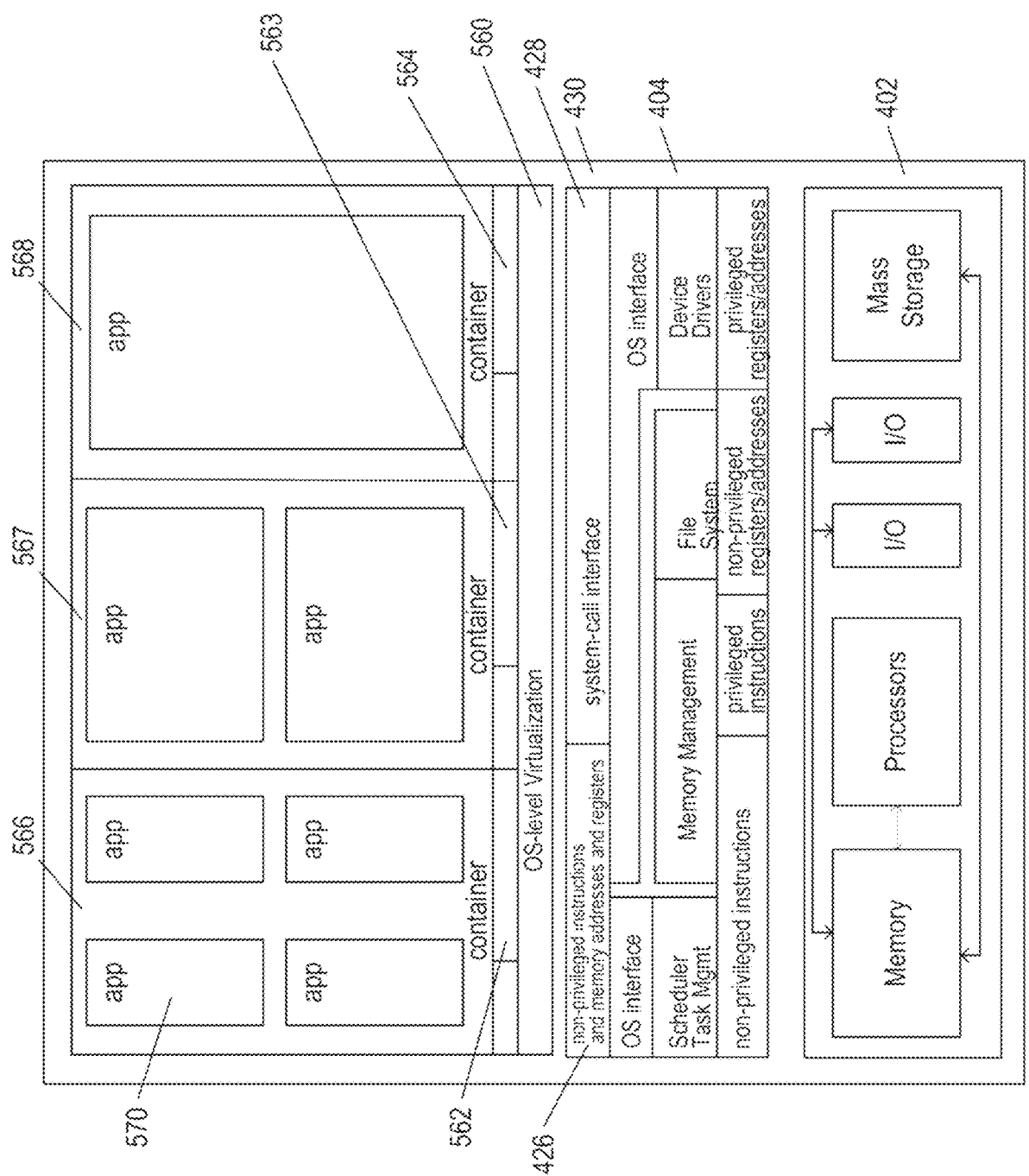

While the traditional virtual-machine-based virtualization layers, described with reference to FIGS. 5A-B, have enjoyed widespread adoption and use in a variety of different environments, from personal computers to enormous distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as name space support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
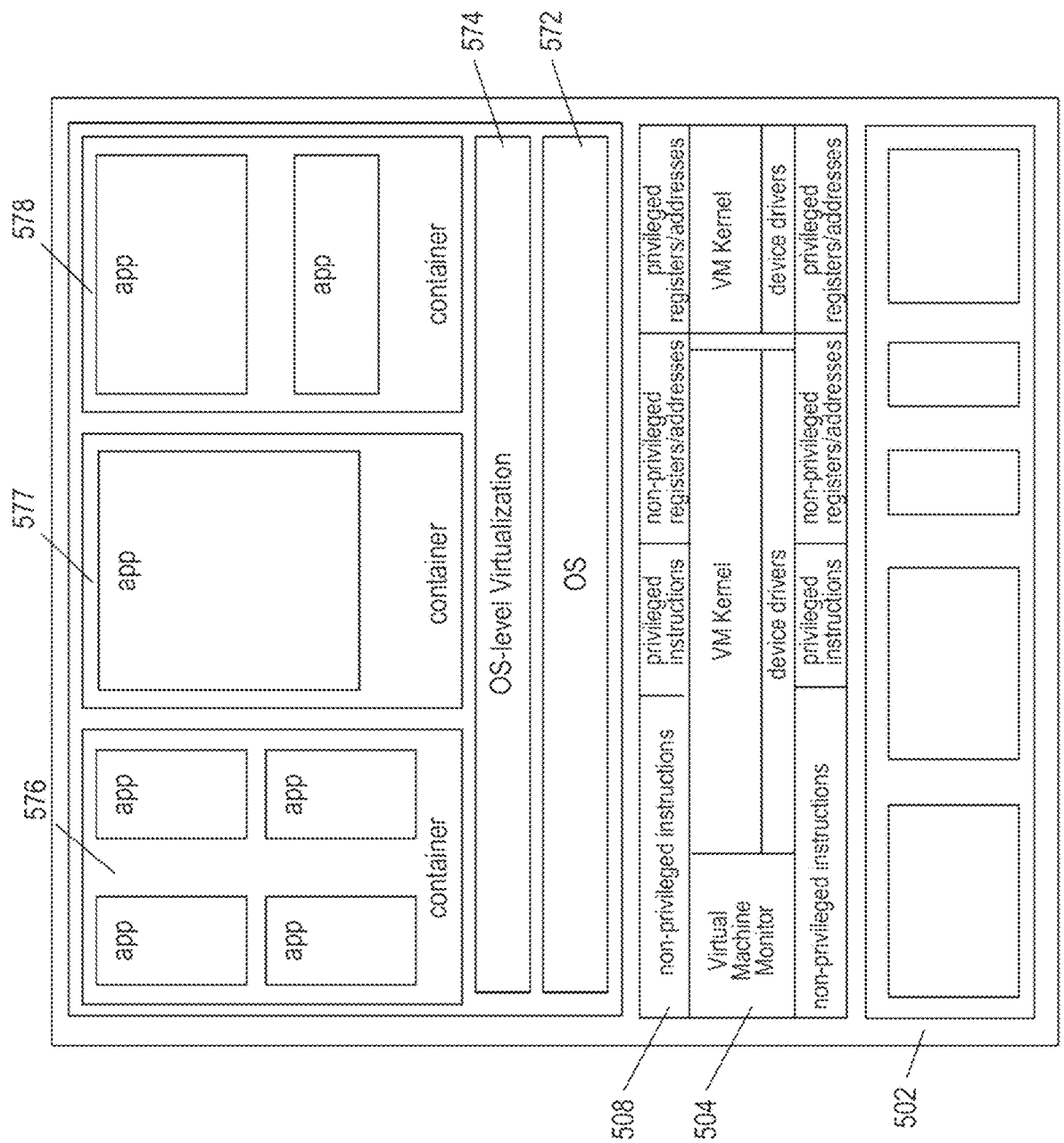

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
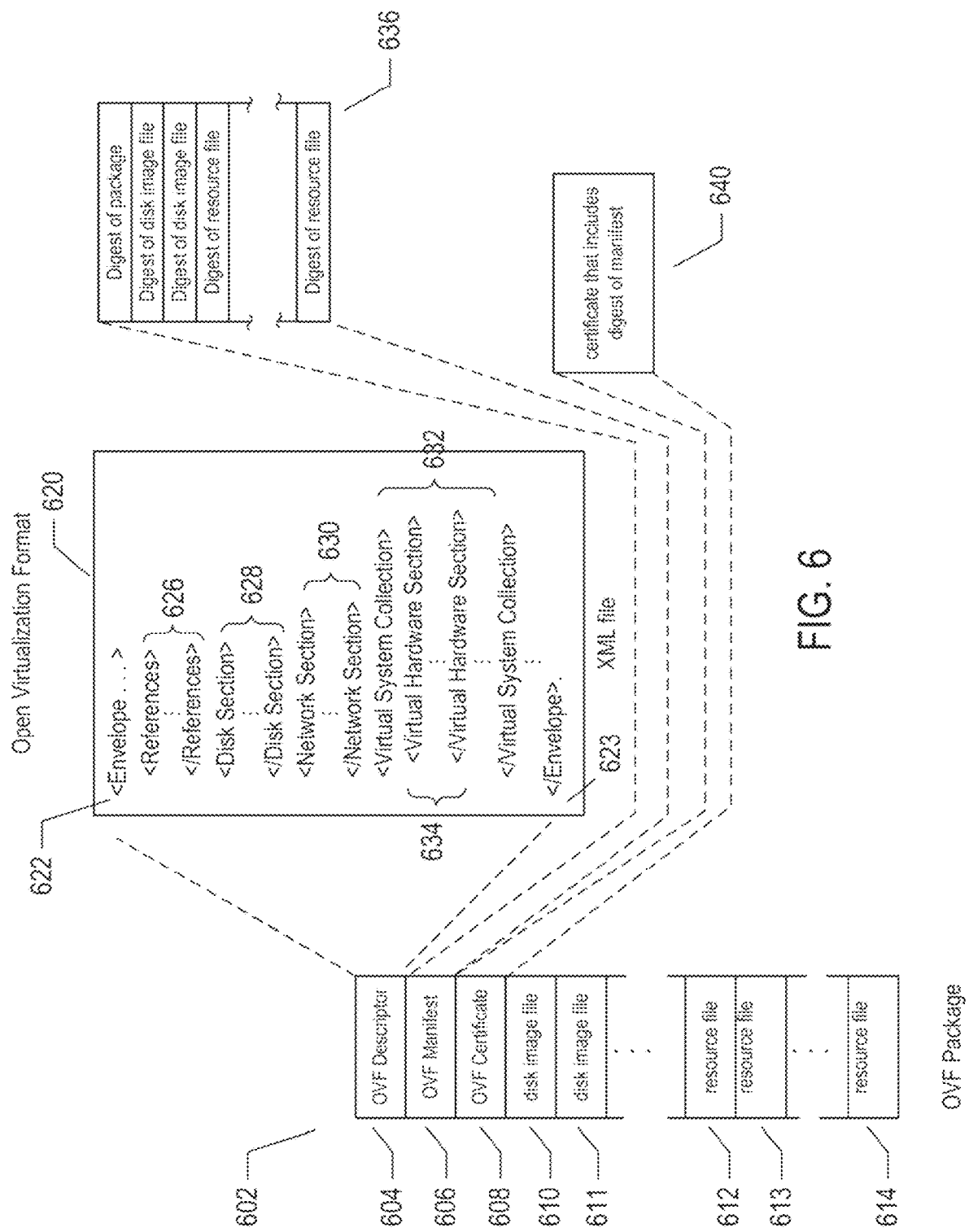
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
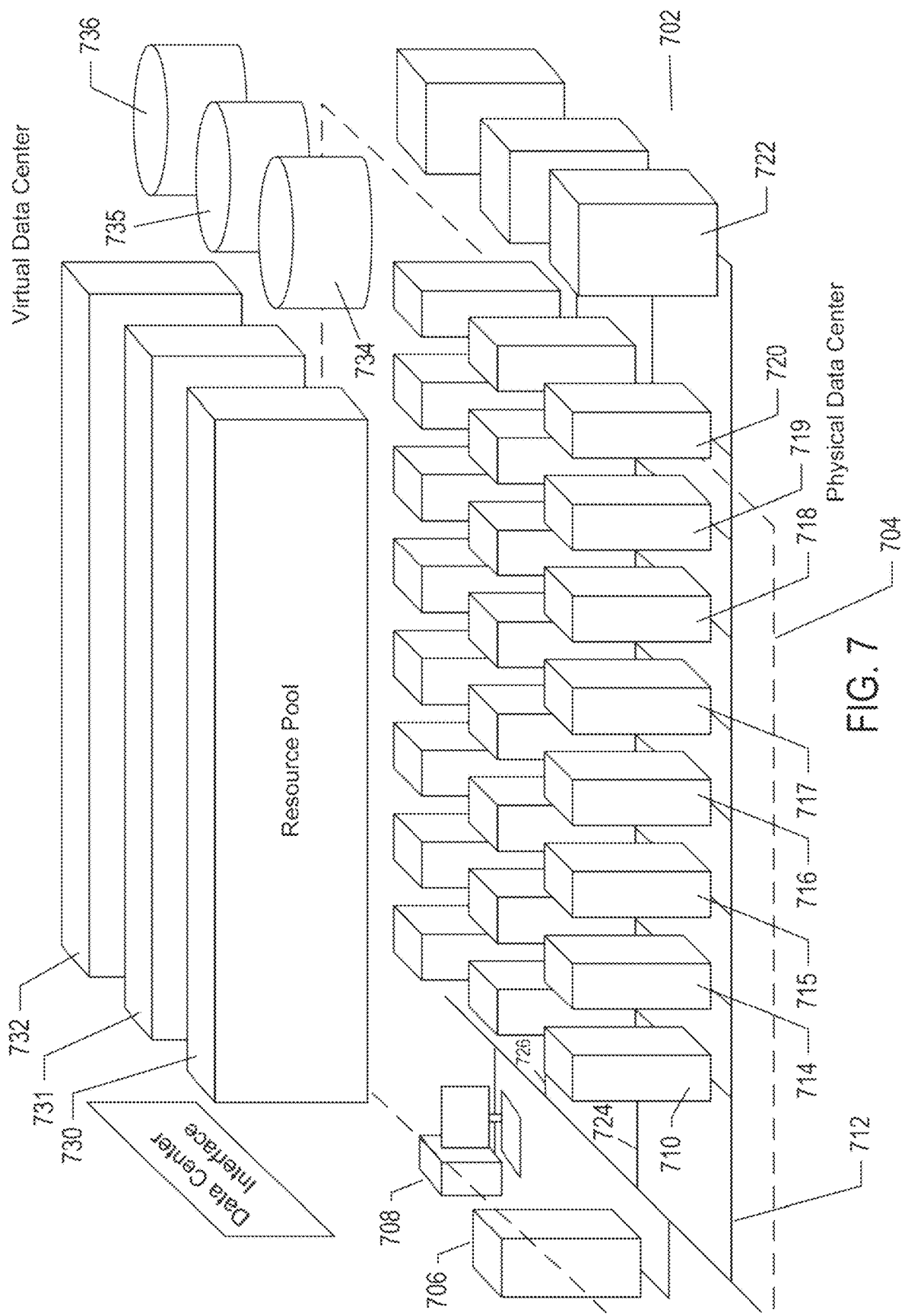
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
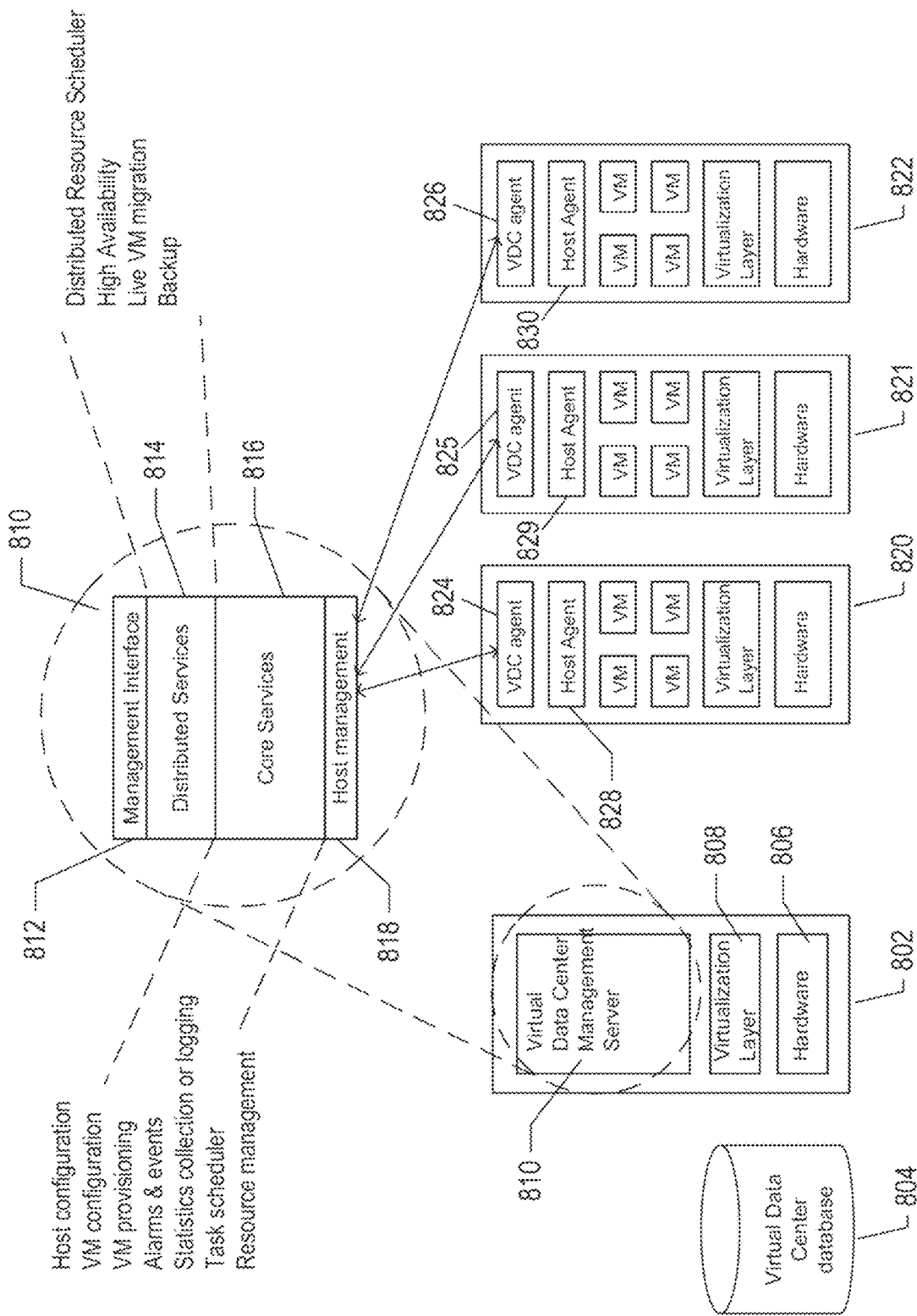
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808 and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a hostagent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
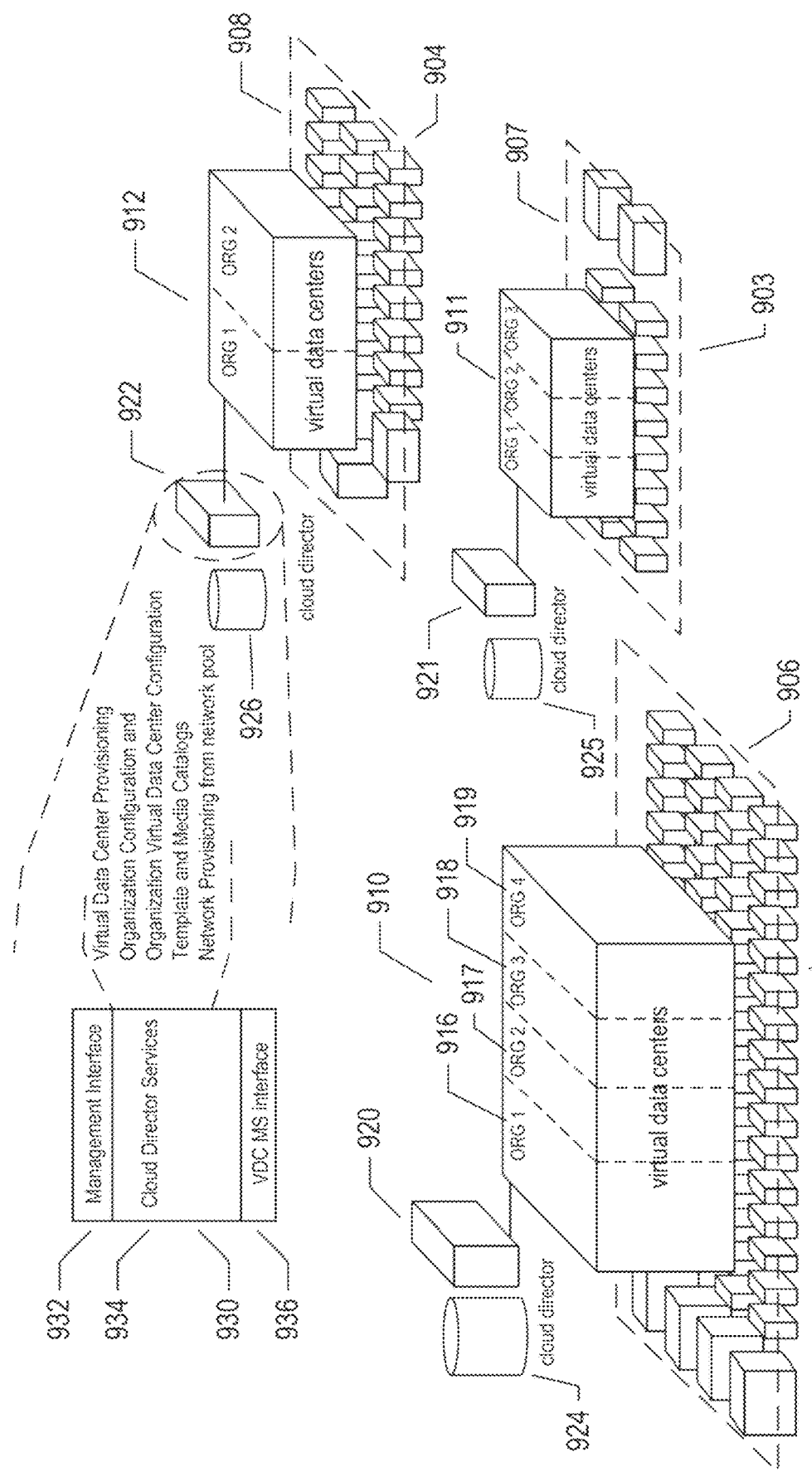
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
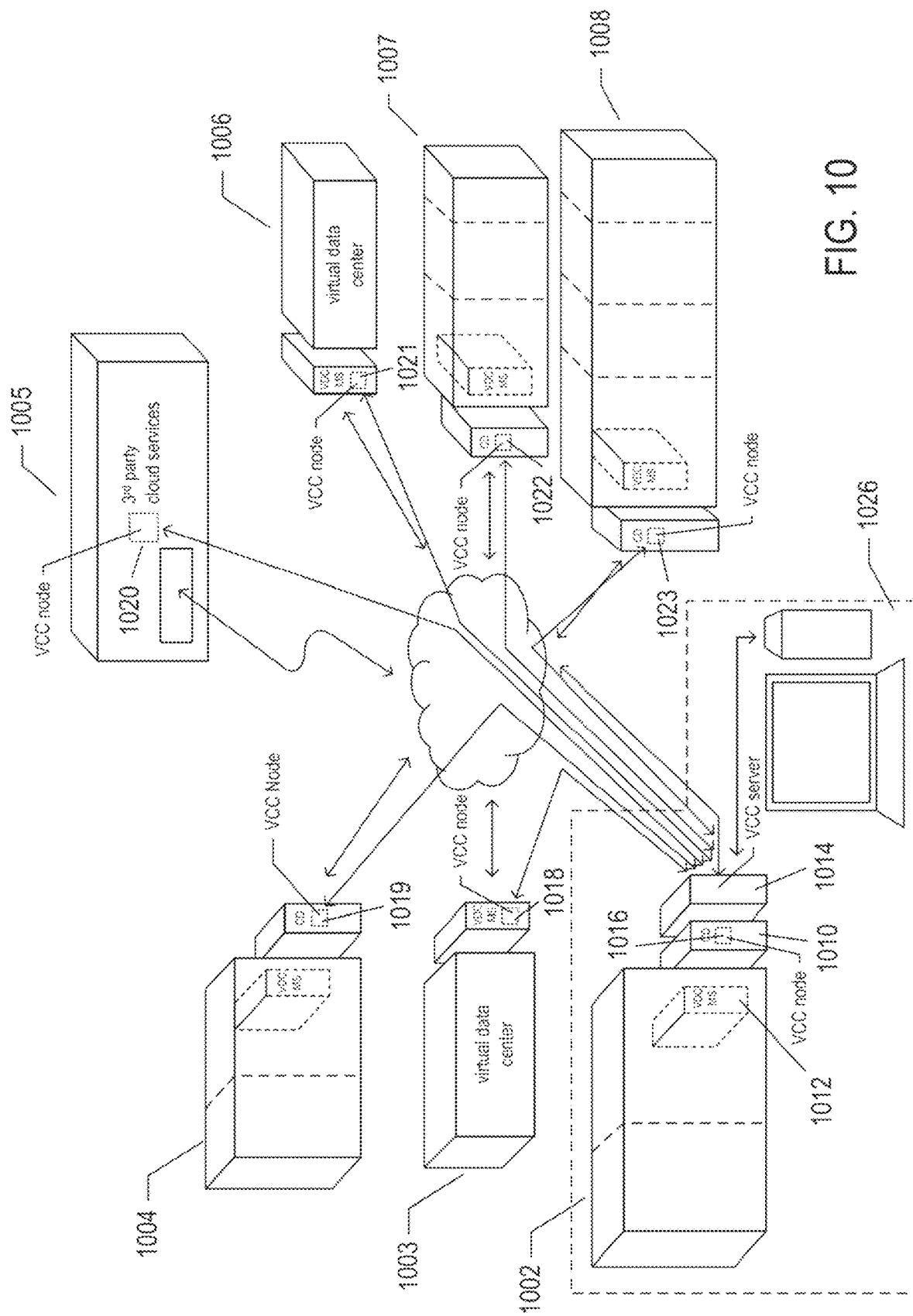
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

The Currently Disclosed Methods and Systems

Figure 11:
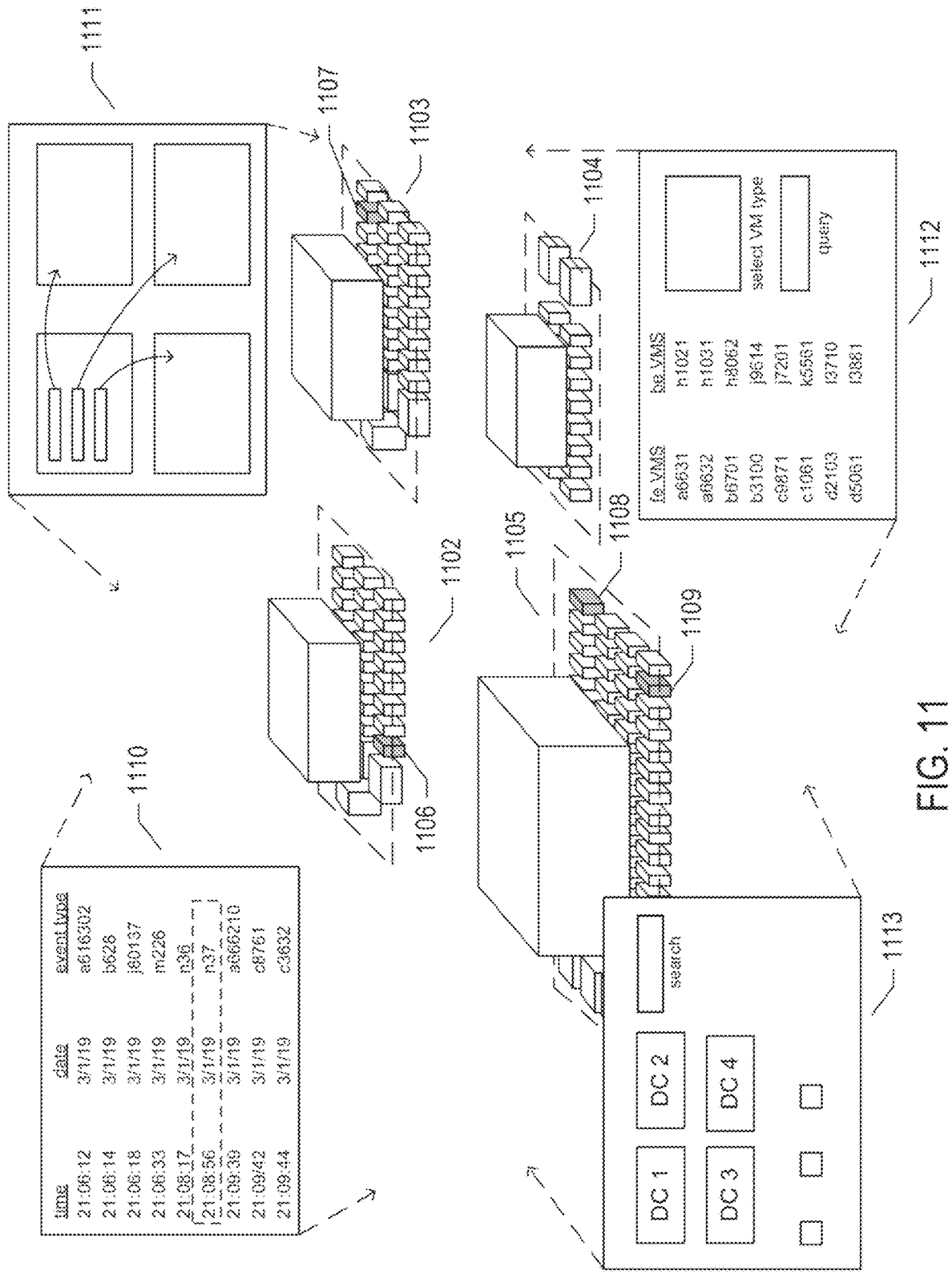
FIG. 11 illustrates the multiple-management-service-and/or-application problem domain to which the currently disclosed methods and systems are directed.

FIG. 11 illustrates the multiple-management-service-and/or-application problem domain to which the currently disclosed methods and systems are directed. As shown in FIG. 11, a distributed cloud-computing facility that includes four data centers 1102-1105 additionally includes four different management servers and/or management applications running within servers 1106-1109 that provide four different sets of functionalities and user interfaces 1110-1113, respectively. Of course, a given management server or management application may run on multiple different servers and use additional appliances and computational resources. The phrase "management servers and/or management application" is used to indicate that cloud-computing-facility management can be implemented as a service or distributed service, which responds to client requests through a service interface, and/or as an application or distributed application that provides an API through which management functionalities are accessed by computational entities. In these various implementations, a user interface may additionally be provided, often by client-side portions of the management servers and/or management applications.

The first management service or management application provides for log-file aggregation and features a service interface, user interface, and/or API 1110 with rich functionality for viewing and searching log files. The second management service or management application provides for sophisticated load balancing among the various data centers involving live migration of virtual machines among the various data centers and provides a service interface, user interface, and/or API 1111 with functionality for controlling and monitoring virtual-machine migration. The third management service or management application provides sophisticated configuration, administration, and management functionalities and provides a service interface, user interface, and/or API 1112 for querying configuration data and adjusting administration and management parameters. The fourth management service or management application provides similar functionality as provided by the third management service or management application, but provides a different set of functions and a very different service interface and user interface 1113. Examples of various types of management services and applications are discussed in the preceding subsection of this document. As mentioned above, the proliferation of different management services and/or applications with different service interfaces, user interfaces, and/or APIs has both provided a wealth of functionality and a variety of different types of information as well as large overheads associated with learning, developing to, and using the different service interfaces, user interfaces, and/or APIs and using the different management services and/or applications concurrently to manage a common set of computational facilities and computational resources.

Figure 12:
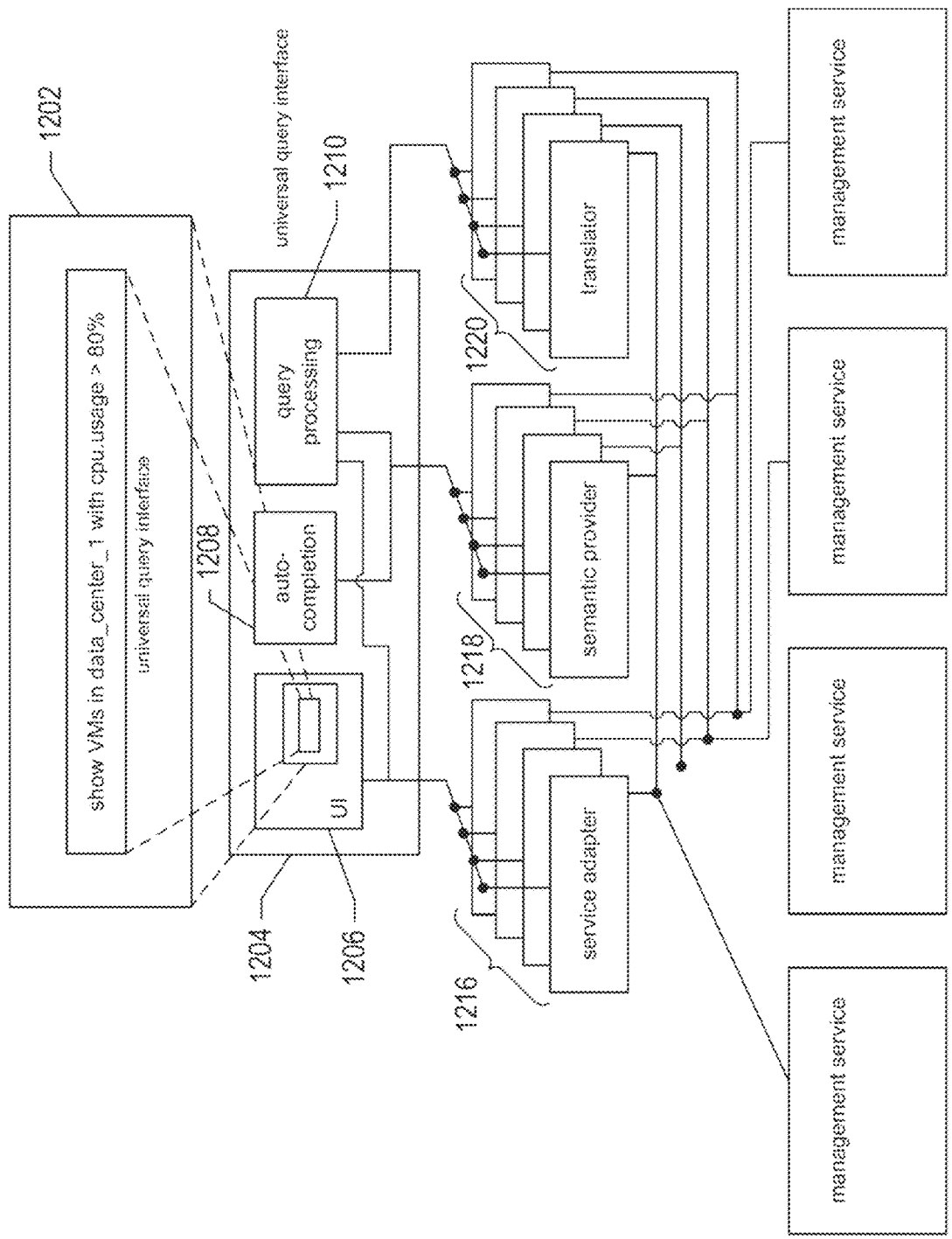
FIG. 12 illustrates a universal-query adapter that has been developed to provide a universal-query interface to multiple management services and/or applications.

FIG. 12 illustrates a universal-query adapter that has been developed to provide a universal-query interface to multiple management services and/or applications. The universal-query interface 1202 allows a user to construct and issue queries in a universal query language for execution across multiple different management services and/or applications. The universal-query adapter 1204 is an application and/or service that includes the following three major modules with associated functionalities: (1) a user-interface module 1206 responsible for instantiating the universal-query interface 1202 on remote computer systems and consoles; (2) an auto-completion module 1208 that is responsible for facilitating query construction by identifying a full noun or verb of the query language from initial characters input by a user and by either displaying the full noun or verb to eliminate a need for the user to type the remaining characters and/or by offering users various different possible choices for a noun or verb based on the initial characters input by a user and/or based on the local context of the query; and (3) a query processing module 1210 that optimizes universal queries and translates the queries into native queries that can be executed by one or more of the multiple different management services and/or applications. The above-mentioned modules of the universal-query adapter access intermediate modules developed to facilitate the adapter role of the universal-query adapter with respect to the multiple management services and/or applications. Associated with each management service and/or application are three different intermediate modules: (1) a service adapter 1216 that provides functionality for submitting an optimized and translated universal query to the management service and/or application with which it is associated and provides functionality for returning the query response to the user-interface module for display and/or forwarding to a user or computational entity that accesses the universal-query adapter through an API; (2) a semantic provider 1218 that provides semantic information about each noun and verb in a universal query, possible completions for nouns and verbs, and validation of query terms within their local contexts in the universal query; and (3) a translator 1220 that maps an expression tree generated by the universal-query adapter for a universal query to the native query syntax expected by the associated management service and/or application. The intermediate modules 1216, 1218, and 1220 interface to the management services and/or applications to provide the various different management-services-and/or-applications functionalities needed by the universal-query adapter.

Figure 13:
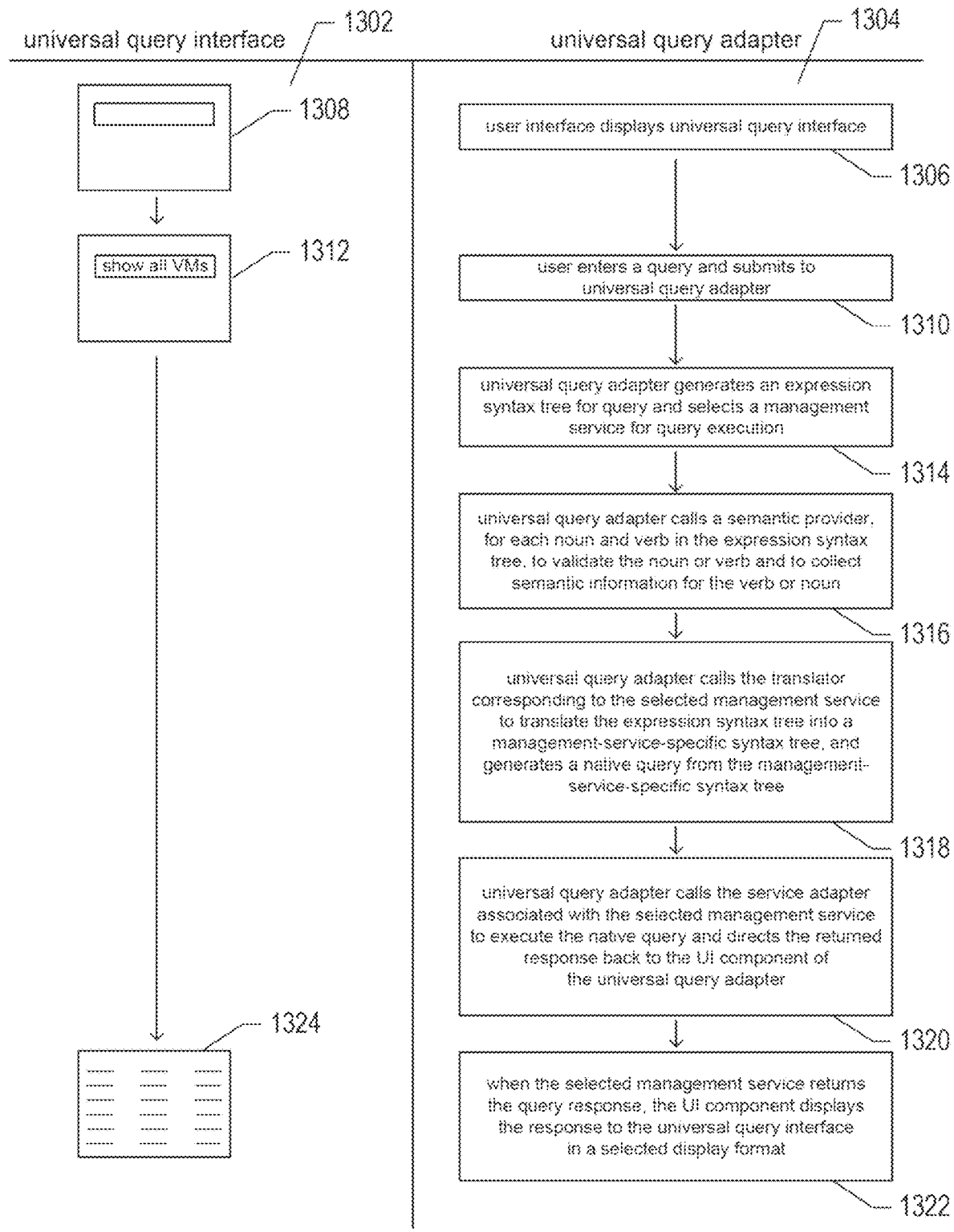
FIG. 13 illustrates an example of the operation of the universal-query adapter discussed with reference to FIG. 12.

FIG. 13 illustrates an example of the operation of the universal-query adapter discussed above with reference to FIG. 12. The left portion 1302 of FIG. 13 shows the representation of the universal-query interface and a right portion 1304 of FIG. 13 shows a representation of the operations performed by the universal-query adapter. In step 1306, the user interface module of the universal-query adapter displays the universal-query interface 1308. In step 1310, a user enters a query 1312 via the universal-query interface and inputs a return or other indication for the universal-query adapter to process the query. During this process, query completion may be provided by the universal-query adapter via the above-mentioned semantic providers. In step 1314, the universal-query adapter generates an expression syntax tree for the query and selects a management service or management application for query execution. In step 1316, the universal-query adapter calls a semantic provider, for each noun and verb in the expression syntax tree, to validate the noun or verb and to collect semantic information for the verb or noun. In step 1318, the universal-query adapter calls the translator intermediate module corresponding to the selected management service to translate the expression syntax tree into a management-service-specific syntax tree, and to then generate a native query from the management-service-specific syntax tree. In step 1320, the universal-query adapter calls the service-adapter intermediate module associated with the selected management service or management application to execute the native query prepared in step 1318, directing the selected management service or management application to return a response to the query back to the user-interface component of the universal-query adapter. In step 1322, the selected management service or management application returns a response to the query to the user-interface module which displays the response 1324 via the universal-query interface. In more complex examples, the universal-query adapter may select multiple management services and/or management applications for executing different portions of a complex universal query.

Figure 14A:
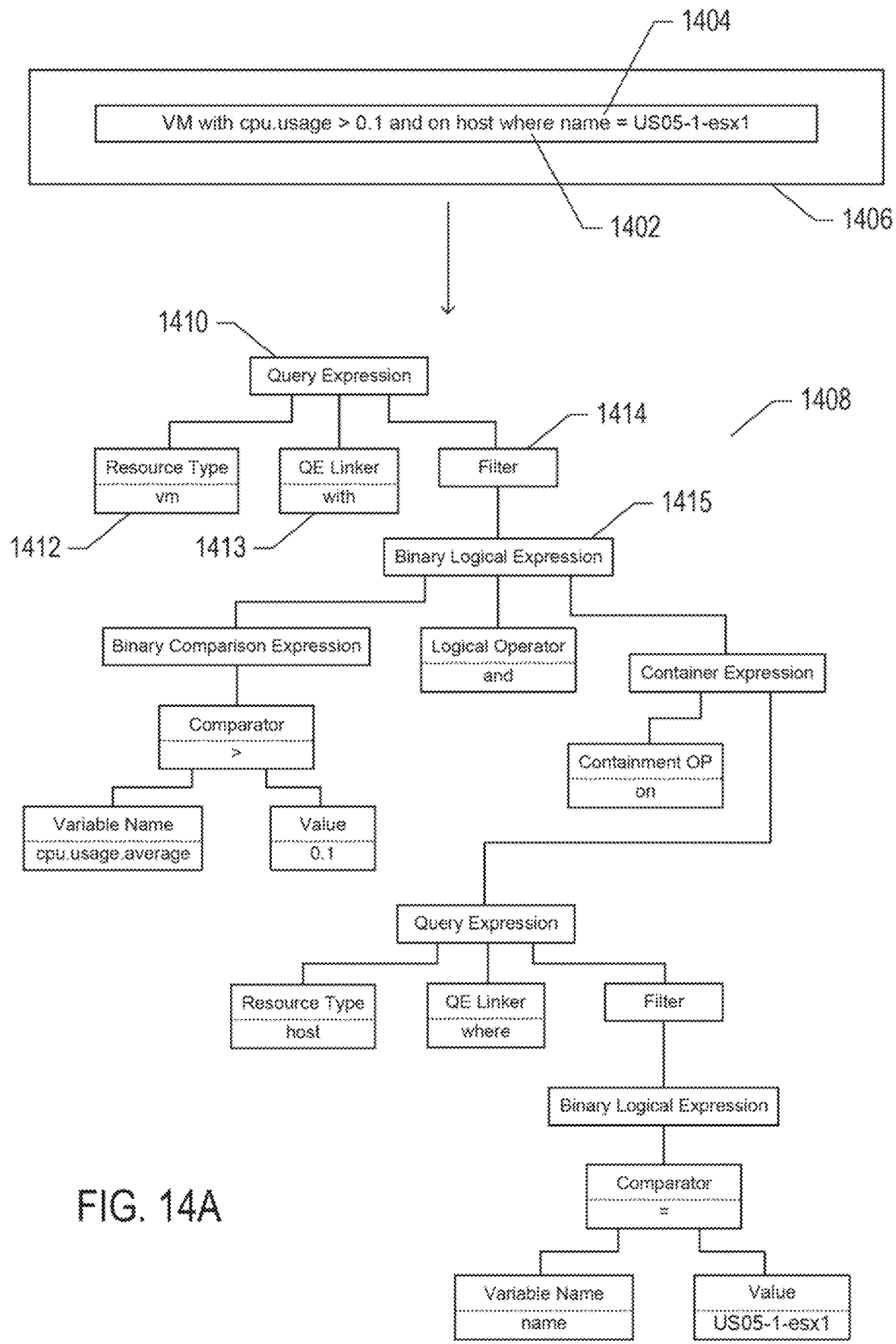

FIGS. 14A-E provide examples of query validation and query translation in which the roles of the semantic providers and translators discussed above with reference to FIGS. 11-13 are illustrated. In FIG. 14A, a user has entered a universal query 1402 into the text-entry window 1404 of the above-described universal-query interface 1406. The query is received by the universal-query adapter, which parses and analyzes the query in order to generate a universal-query abstract syntax tree 1408. Each node in the abstract syntax tree represents either the query or an element or construct within the query. For example, node 1410, the root node of the abstract syntax tree, indicates that the input query 1402 is a type of query denoted by the universal-query adapter as "QueryExpression." Of course, there are many different approaches to developing generalized query languages, each approach potentially providing different types of queries and different types of syntaxes. A query-expression node references three child elements or constructs: (1) a ResourceType element 1412, a query-expression linker element 1413, and a construct or element 1414 that qualifies or constrains the type of resource indicated by the ResourceType element. In the current case, the third child 1414 is a filter comprising a binary logical expression represented by the BinaryLogicalExpression node 1415. Certain of the nodes in the abstract syntax tree, such as node 1412, are partitioned by horizontal dashed line segments, with the types of element or construct indicated above the dashed line segments and the corresponding text from the query indicated below the dashed line segments. The entire query 1402 can be read from the contents of the nodes in the abstract syntax tree 1408.

Figure 14B:
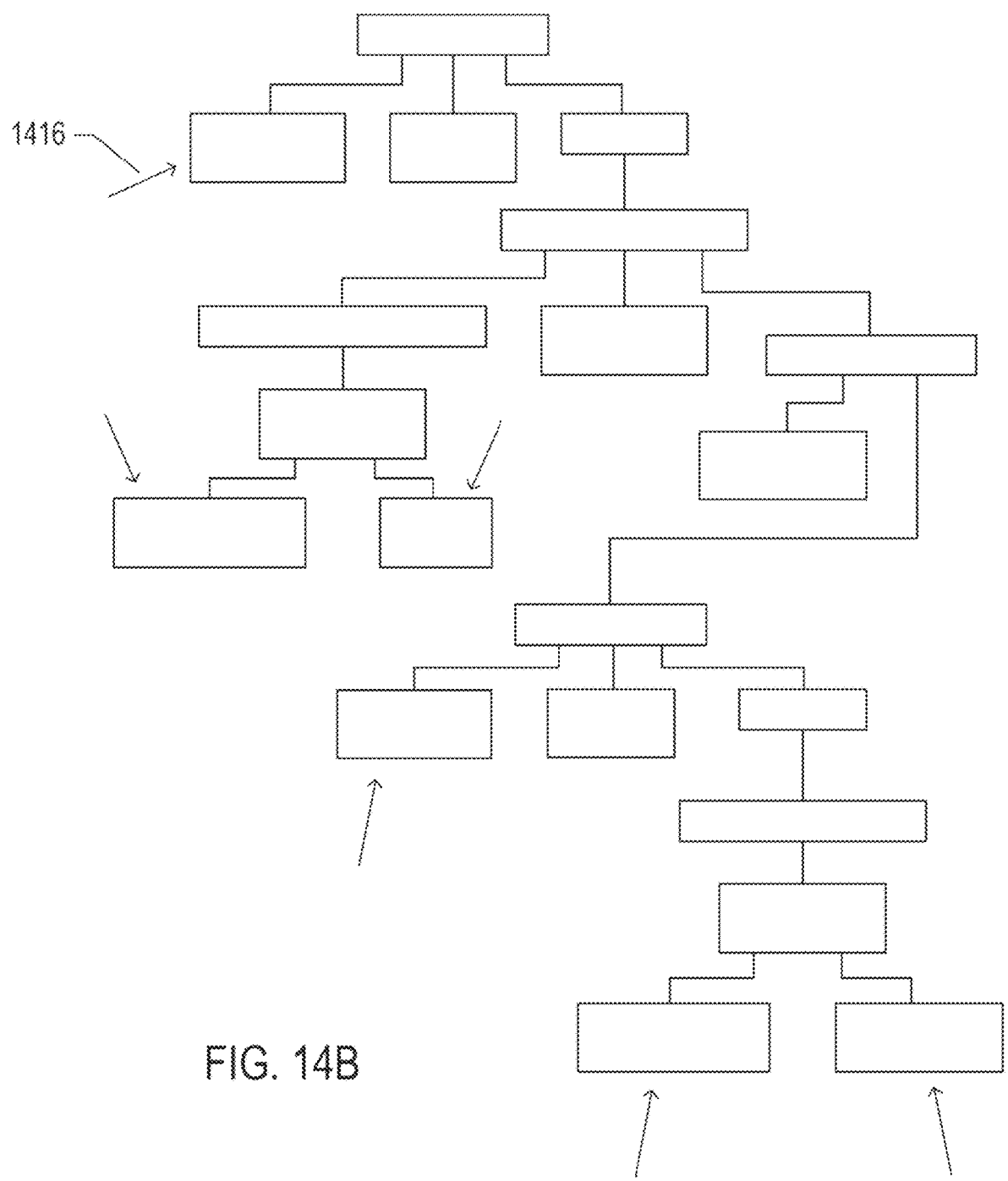

As shown in FIG. 14B, following preparation of the abstract syntax tree, the universal-query adapter identifies nodes of the abstract syntax tree corresponding to elements or constructs that can be verified by calling semantic providers associated with one or more management applications and/or services to which the query will be submitted for execution. In FIG. 14B, the nodes corresponding to elements that can be verified are indicated by arrows, such as arrow 1460. Note that the nodes in the abstract syntax tree shown in FIG. 14B are not labeled, but the abstract syntax tree shown in FIG. 14B corresponds to the same abstract syntax tree shown in FIG. 14A. Verification of the abstract-syntax-tree nodes can be carried out following processing of a complete query or can be carried out for portions of the query for which verifiable elements have been identified prior to completion of the query entry by a user.

As shown in FIG. 14C, the universal-query adapter calls one or more semantic providers to obtain various types of information regarding the verifiable elements discussed above with reference to FIG. 14B. In certain implementations, the universal-query adapter or the semantic provider may call a resource-name-and-attribute correlation service to translate the universal-query-language portions of the input query corresponding to verifiable elements into a native form understood by the management application or service associated with the semantic provider. For the verifiable element "vm," represented by the ResourceType node 1412, for example, the universal-query adapter or the semantic provider calls the resource-name-and-attribute correlation service to translate the universal-query-language resource type "vm" into corresponding language for that resource type used by the management application or service associated with the semantic provider that the universal-query adapter calls for verification and additional semantic information. The universal-query adapter may also pass an abstract-syntax-tree context for the element so that the semantic provider can evaluate the element within the context in which it occurs within the query. The resource-name-and-attribute correlation service returns "vm" 1418, indicating that the management application or service also uses "vm" for the virtual-machine resource type. The universal-query adapter furnishes the element 1412, or a data representation of the element 1412, and may additionally furnish a context for the element, to the resource-type semantic provider associated with the management application or service and receives, from the semantic provider, various types of semantic information with regard to the resource type "vm" 1420. The types of semantic information, and the formatting conventions used to encode the semantic information, may vary both with implementation and with the type of element. In the example shown in FIG. 14C, the returned information indicates that the resource type "vm" is considered to be a "node" by the management application or service, that nodes are represented by entries in a table Nodes, that a virtual machine is identified by a value in the field ID in the table Nodes and by a value in the field ID in the table VMs. The returned information may also indicate the various fields contained in the tables Nodes and VMs. The semantic information may additionally include indications of native sub-queries or stored procedures that can be used to access the element. The information returned by the semantic provider includes, for elements 1412 and 1421-1423, includes similar information about the correspondence between the elements and fields within relational database tables, which, in turn, indicates that these elements are valid elements for the management application or service. Of course, for different management applications and/or services, the returned information may be quite different. For example, certain management applications and/or services may employ a relational database for storing information used to execute queries, but other management applications and/or services may, instead, employ other types of data storage or database management systems. In the example of FIGS. 14A-E, the semantic providers return explicit indications of validity 1424-1425 for value elements 1426 and 1427, respectively. Indications of validity, in the current case, do not indicate that the values themselves are valid, but only that the language used in the query, or used in the translated equivalents to language used in the query, to represent the values has a proper format for the types of values stored for these value elements by the management application or service. In alternative implementations, semantic providers may return explicit indications of validity or invalidity for each verifiable element. The universal-query adapter uses any indications of invalidity returned by semantic providers to request corrections to queries from a user or to show proposed corrections or correct alternatives to users for selection in order to facilitate completion of a provisionally correct universal query for parsing, translation, and execution.

Figure 14D:
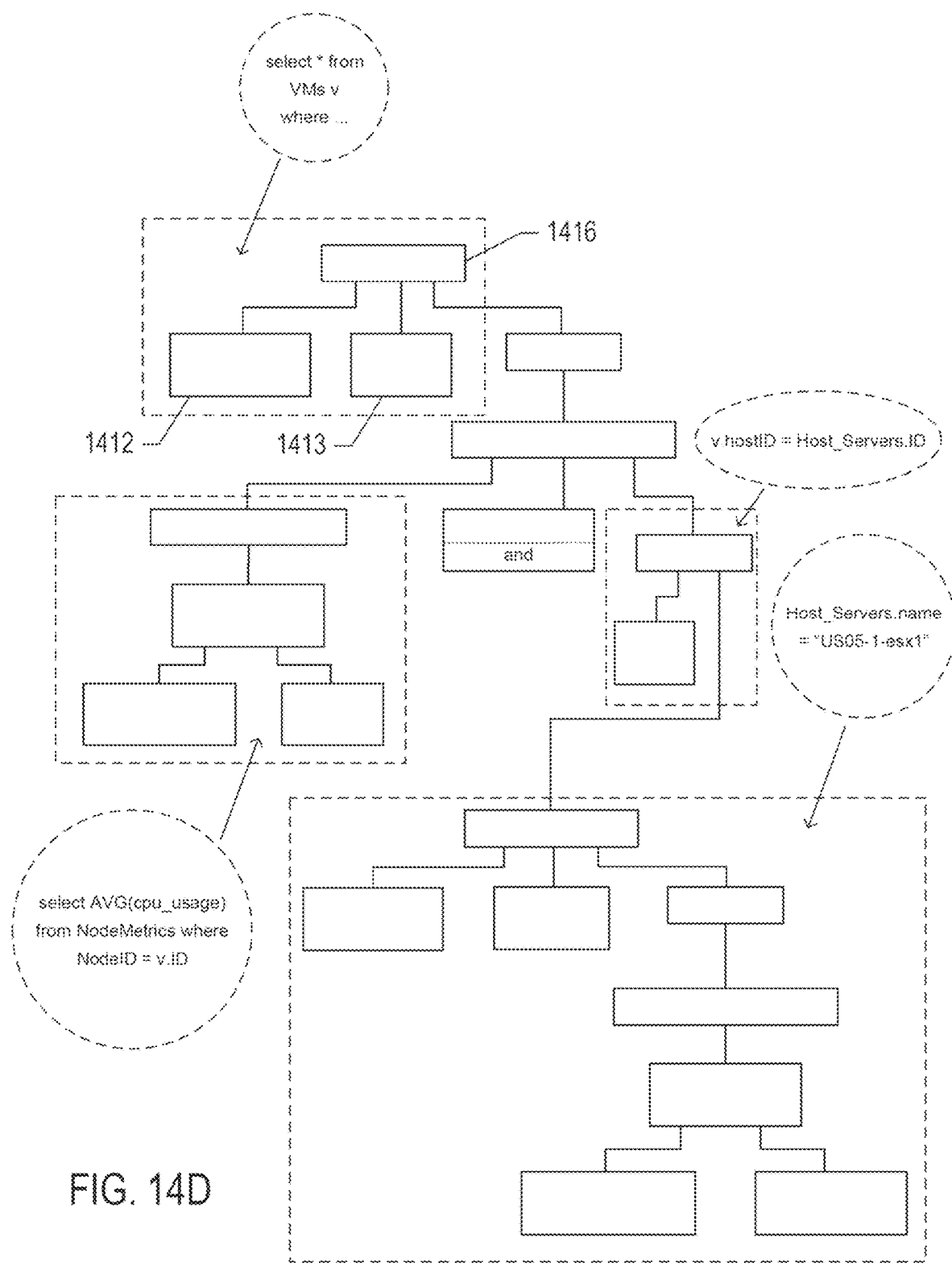

As shown in FIG. 14D, the semantic information provided by the semantic providers, along with a complete abstract syntax tree for received query, can be provided to the translator associated with a management application or service to translate the information contained in the abstract syntax tree into a native query for the management application or service to execute. In the example of FIGS. 14A-E, the translator first identifies portions of the abstract syntax tree, shown in FIG. 14D delineated by dashed rectangles, that rather directly correspond to statements or clauses in the native query language. For example, the QueryExpression node 1410, and the first two child nodes 1412 and 1413 of QueryExpression node 1410, together correspond to a relational-database query that selects rows or portions of rows from the relational-database table VMs, which contains stored information describing virtual machines 1430. Then, the translator combines the identified statements or clauses together to form a corresponding native query, shown as structured-query-language ("SQL") statement 1432 in FIG. 14E. The use of semantic providers and translators therefore allows a general universal-query adapter to be implemented without knowledge of detailed information about the target query interfaces and native query languages provided by the multiple management applications and/or services for query execution. This facilitates universal-query-adapter implementation and also provides significant scalability, since new or newly identified management applications and/or services can be readily included in the set of targets for execution of universal queries once developers of the new or newly identified management applications and/or services furnish the needed semantic providers and translators. In other words, the above-described modular architecture for the universal-query adapter cleanly divides the universal-query-adapter implementation into an implementation of logic for universal-query parsing and abstract-syntax-tree generation, implementation of the logic needed for the query-completion feature, implementation of semantic-provider and translator adapters for adapting the universal query language to native query languages used by the management applications and/or services, and implementation of the logic involved with scheduling query execution by management applications and/or services and returning the results of query execution to the universal-query adapter. Currently available products that attempt to provide a common interface to multiple management applications and/or services, lacking such a modular approach, suffer from unnecessarily complex implementations and an inability to efficiently incorporate new or newly discovered management applications and/or services as targets for query execution.

Figure 15A:
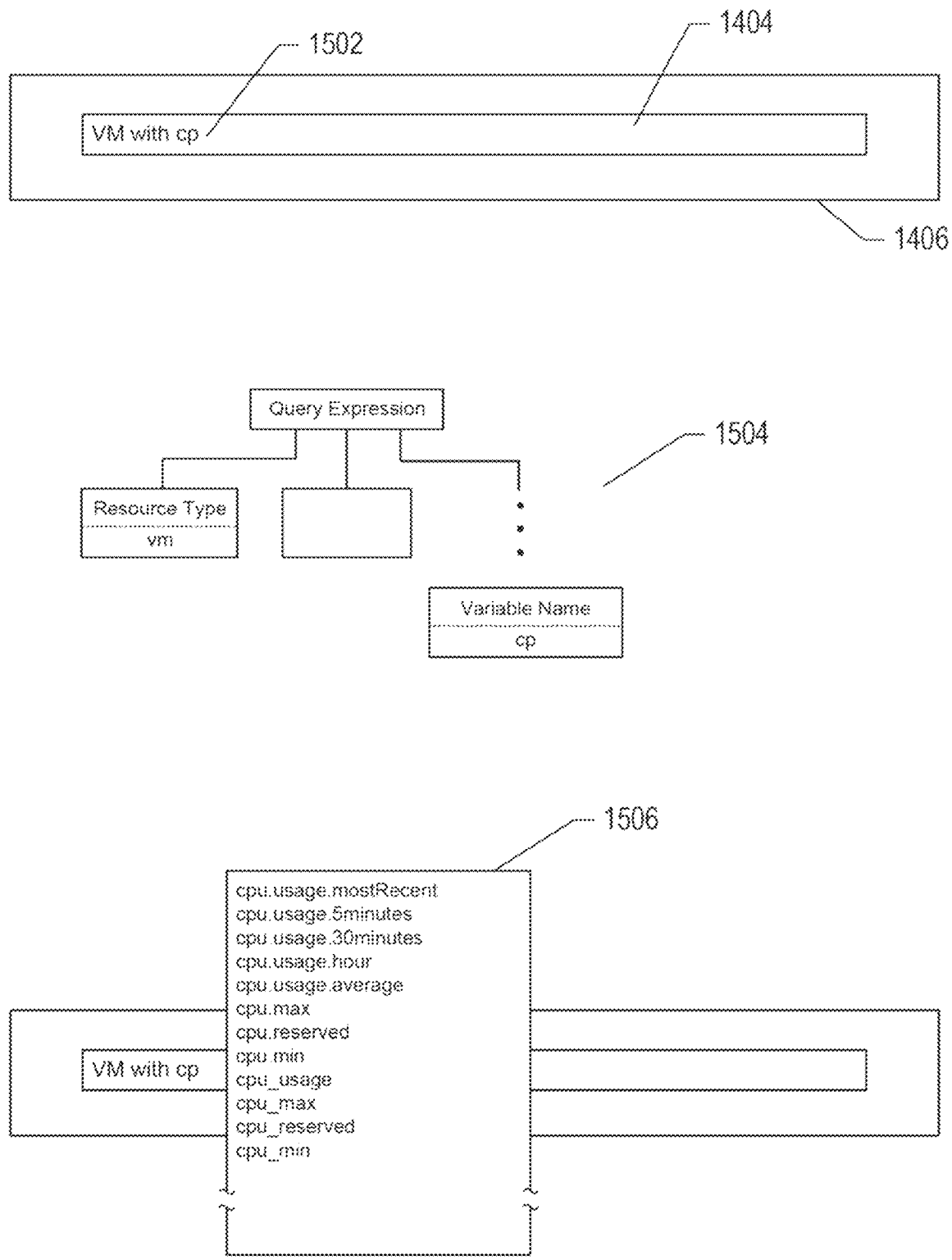
FIGS. 15A-B provide an example of query completion in which the role of the semantic providers is illustrated.
Figure 15B:
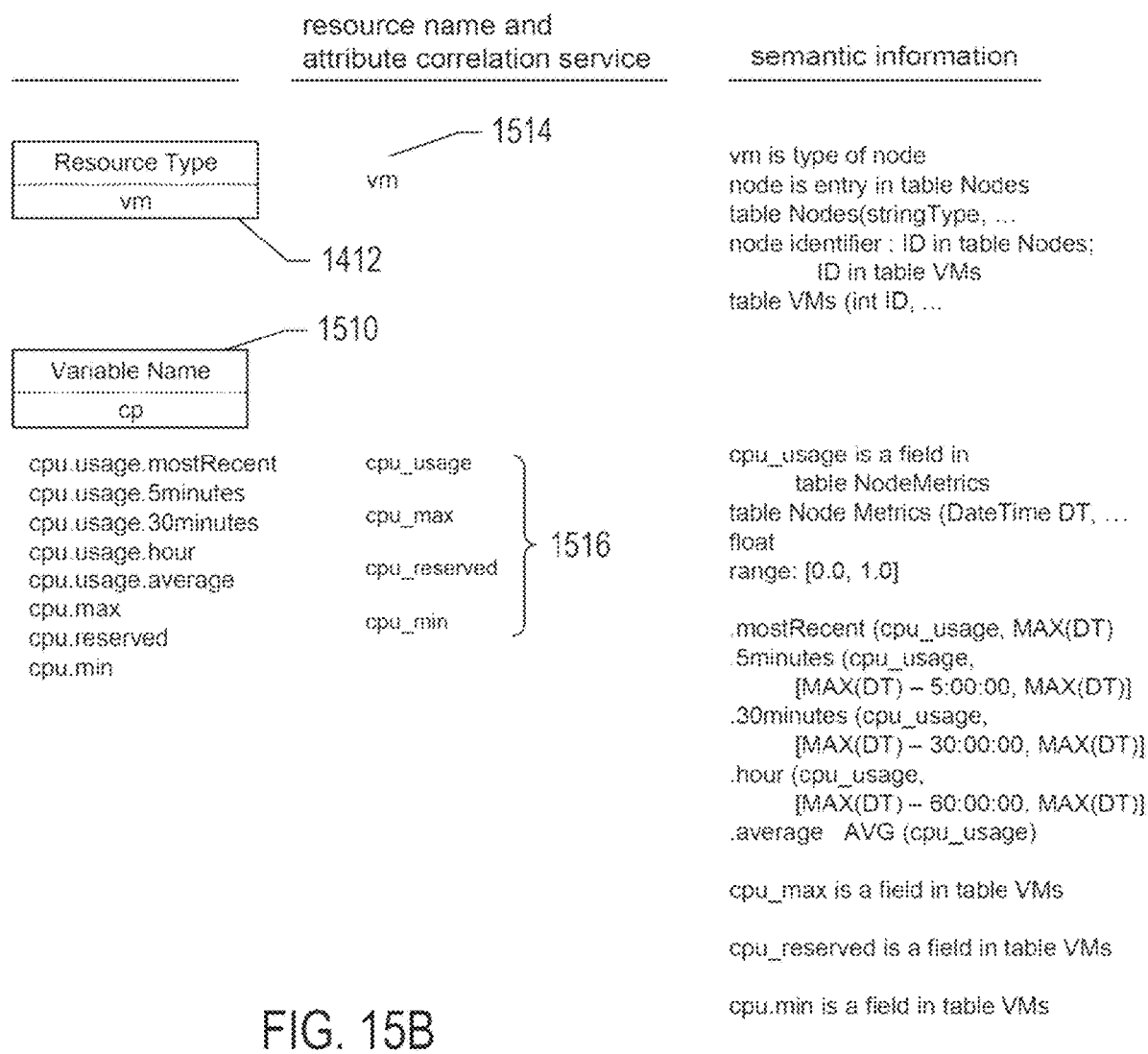

FIGS. 15A-B provide an example of query completion in which the role of the semantic providers is illustrated. At the top of FIG. 15A, a user has input a portion of a query 1502 into the text-entry feature 1404 of the universal-query interface 1406. As the query is being received, the universal-query adapter prepares an initial portion of an abstract syntax tree 1504 that represents the input text 1502. The universal-query adapter accesses one or more semantic providers in order to obtain a list of possible completions for the query term that begins with "cp," and then displays the list of possible completions in a completion-display feature 1506 that allows the user to select the appropriate term rather than continuing to type the term. As shown in FIG. 15B, using illustration conventions similar to those used in FIG. 14C, discussed above, the universal-query adapter furnishes a context for the abstract-syntax-tree node 1510 corresponding to the query term for which a completion list is needed to a semantic provider. The context includes abstract-syntax-tree nodes 1510 and 1412, as well as a list of possible universal-query-language completions 1512 and translations 1514 and 1516 provided by a resource-name-and-attribute correlation service. In response, the semantic provider provides various types of semantic information for the translations shown in the final column 1518 of FIG. 15B. The list of possible completions displayed in the completion-display feature 1506 shown in FIG. 15A includes possible universal-query-language completions as well as possible completions using terms native to the one or more management applications and/or services. In many implementations, the universal query language accommodates use of management-application-or-service-specific terms in queries, provided that the queries are not ambiguous.

Figure 16:
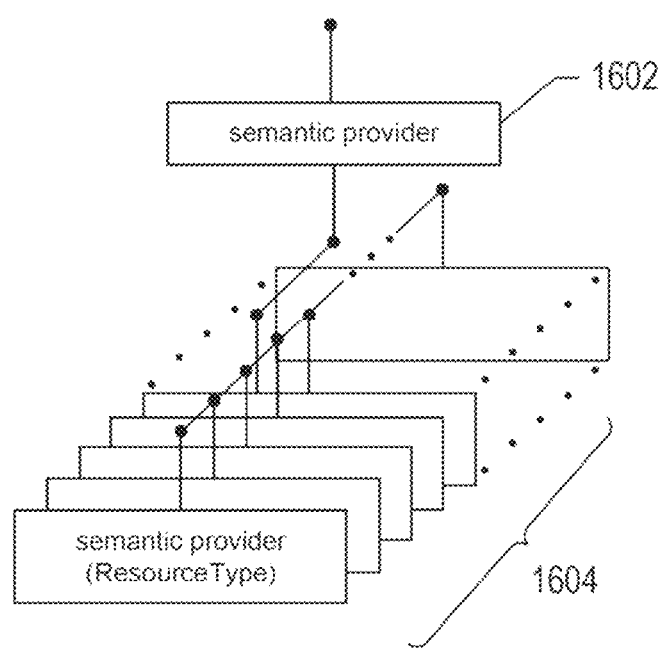
FIG. 16 provides additional detail with respect to semantic providers not shown in FIG. 12.

FIG. 16 provides additional detail with respect to semantic providers not shown in FIG. 12. As shown in FIG. 16, the semantic provider 1602 associated with a particular management application or service is, in actuality, multiple semantic providers 1604, each of which specializes in providing validity indications and additional semantic information for a particular type of abstract-syntax-tree element or node. The adapters to which the universal-query adapter interfaces may include a single, general semantic provider for each management application or service which, in turn, internally calls multiple internal semantic providers, or may include multiple semantic providers associated with each management application or service.

The present invention has been described in terms of particular embodiments, it is not intended that the invention be limited to these embodiments. Modifications within the spirit of the invention will be apparent to those skilled in the art. For example, any of many different implementations of the currently disclosed methods and systems for providing a general query interface to multiple management applications and services can be obtained by varying various design and implementation parameters, including modular organization, control structures, data structures, hardware, operating system, and virtualization layers, and other such design and implementation parameters. As mentioned above, many different alternatives are possible with respect to the detailed functional interfaces of the semantic providers, translators, and service adapters. In addition, query contexts and abstract query trees may be represented in a variety of different ways for provision to semantic providers and translators.

What is claimed is:

1. A universal-query adapter that provides, to users and clients, a universal-query-language interface through which the users and clients access management applications and/or services that provide management services for a cloud-computing facility, the universal-query adapter implemented on one or more computer systems and comprising:
 the universal-query interface;
 query-processing logic that generates a universal-query-language abstract syntax tree corresponding to a query input through the universal-query interface; and
 an interface to management-application-or-service-specific adaptors, including
  an interface to service adapters, each service adapter associated with a management application or service, through which the universal-query adapter schedules execution of native queries by associated management applications and/or services and receives responses from execution of the translated queries,
  an interface to semantic providers, each semantic provider associated with a management application or service, through which the query-processing logic obtains indications of validity of, and semantic information for, query elements and constructs, and
  an interface to translators, each translator associated with a management application or service, through which the universal-query adapter requests translation of universal-query-language abstract syntax trees to native queries.

2. The universal-query adapter of claim 1 wherein the query-processing logic transmits an element of a universal-query-language query to a semantic provider through the interface to semantic providers and receives, from the semantic provider, an indication of whether or not the element is a valid native-query element and additional semantic information related to the element.

3. The universal-query adapter of claim 2 wherein the query-processing logic additionally transmits a query context for the element to the semantic provider, the query context comprising a portion of an abstract syntax tree containing the element or related abstract-syntax-tree nodes.

4. The universal-query adapter of claim 2 wherein the additional semantic information includes one or more of:
- related elements,
- details of how the element is stored and accessed by the associated management application or service,
- descriptions of the meaning of the elements,
- indications of identifiers used for the element, and
- sub-queries or stored procedures that can be used to access the element.

5. The universal-query adapter of claim 2 wherein the universal-query adapter or the semantic provider calls a resource-name-and-attribute correlation service to translate the universal-query-language portions of the input query corresponding to verifiable elements into a native form used by the management application or service associated with the semantic provider.

6. The universal-query adapter of claim I wherein the universal-query adapter transmits an abstract syntax tree and additional semantic information received from semantic providers with respect to elements of the abstract syntax tree to a translator through the interface to translators and receives, from the translator, a native query that can be executed by a management application or service.

7. The universal-query adapter of claim 1 wherein the universal-query adapter transmits a native query and information with regard to execution scheduling and return of response data to the universal-query adapter to a service adaptor through the interface to service adapters, the management application or service associated with the service adaptor executes the query to generate response data, and the management application or service information supplied by the universal-query adapter to transmit the response data to the universal-query adapter.

8. The universal-query adapter of claim 1 wherein the universal-query adapter further comprises query completion logic that provides a display of possible complete query terms to a user through the universal-query interface while the user inputs the term, allowing the user to select one of the displayed possible complete query terms rather than finish inputting the term.

9. The universal-query adapter of claim 7 wherein the query completion logic transmits a partially input element of a universal-query-language query to a semantic provider through the interface to semantic providers and receives, from the semantic provider, a list of possible complete elements.

10. The universal-query adapter of claim 8 wherein the query completion logic additionally transmits a query context for the partially input element to the semantic provider.

11. A method that provides a universal-query interface to multiple management applications and/or services that provide management services for a cloud-computing facility, distributed computer system, or virtual data center, the method comprising:
- receiving universal-query-language query through a universal-query interface;
- generating a universal-query-language abstract syntax tree corresponding to the received query;
- identifying verifiable elements within the universal-query-language abstract syntax tree;
- calling one or more semantic providers, each semantic provider associated with a management application or service, through which the query-processing logic obtains indications of the validity of, and semantic information for, the identified verifiable elements;
- calling a translator, associated with a management application or service, to translate the universal-query-language abstract syntax tree to a native query; and
- calling a service adapter, associated with a management application or service, to schedule execution of the native query by the management application and/or service.

12. The method of claim 11 carried out by a universal-query adapter comprising:
- the universal-query interface:
- query-processing logic that generates the universal-query-language abstract syntax tree corresponding to the query;
- an interface to multiple service adapters, each service adapter associated with a management application or service, through which the universal-query adapter schedules execution of native queries by associated management applications and, or services and receives responses from execution of the translated queries,
- an interface to semantic providers, each semantic provider associated with a management application or service, through which the query-processing logic obtains indications of validity of, and semantic information for, query elements and constructs, and
- an interface to translators, each translator associated with a management application or service, through which the universal-query adapter requests translation of universal-query-language abstract syntax trees to native queries.

13. The method of claim 12 wherein the query-processing logic transmits an element of a universal-query-language query to a semantic provider through the interface to semantic providers and receives, from the semantic provider, an indication of whether or not the element is a valid native-query element and additional semantic information related to the element.

14. The method of claim 13 wherein the query-processing logic additionally transmits a query context for the element to the semantic provider, the query context comprising a portion of an abstract syntax tree containing the element or related abstract-syntax-tree nodes.

15. The method of claim 13 wherein the additional semantic information includes one or more of:
- related elements,
- details of how the element is stored and accessed by the associated management application or service,
- descriptions of the meaning of the elements,
- indications of identifiers used for the element, and
- sub-queries or stored procedures that can be used to access the element.

16. The method of claim 1 wherein the universal-query adapter further comprises query completion logic that provides a display of possible complete query terms to a user through the universal-query interface while the user inputs the term, allowing the user to select one of the displayed possible complete query terms rather than finish inputting the term.

17. The method of claim 16 wherein the query completion logic transmits a partially input element of a universal-query-language query to a semantic provider through the interface to semantic providers and receives, from the semantic provider, a list of possible complete elements.

18. The method of claim 8 wherein the query completion logic additionally transmits a query context for the partially input element to the semantic provider.

19. A physical data-storage device encoded with computer instructions that, when executed by one or more processors within one or more computer systems, control the one or more computer systems to provide a universal-query interface to multiple management applications and/or services that provide management services for a cloud-computing facility, distributed computer system, or virtual data center by:

receiving universal-query-language query through a universal-query interface;

generating a universal-query-language abstract syntax tree corresponding to the received query;

identifying verifiable elements within the universal-query-language abstract syntax tree;

calling one or more semantic providers, each semantic provider associated with a management application or service, through which the query-processing logic obtains indications of the validity of, and semantic information for, the identified verifiable elements;

calling a translator, associated with a management application or service, to translate the universal-query-language abstract syntax tree to a native query; and calling a service adapter, associated with a management application or service, to schedule execution of the native query by the management application and/or service.

\* \* \* \* \*